United States Patent
Jerger et al.

(10) Patent No.: US 9,657,834 B2
(45) Date of Patent: May 23, 2017

(54) VEHICLE CONTROL SYSTEM AND METHOD

(71) Applicant: Jaguar Land Rover Limited, Whitley Coventry Warwickshire (GB)

(72) Inventors: Rob Jerger, Stockton (GB); Jonathan Woodley, Warwick (GB); Navid Shamshiri, Coventry (GB); Andrew Raftry, Redditch (GB)

(73) Assignee: Jaguar Land Rover Limited, Whitley, Coventry, Warwickshire (GB)

( * ) Notice: Subject to any disclaimer, the term of this patent is extended or adjusted under 35 U.S.C. 154(b) by 0 days.

(21) Appl. No.: 14/910,692

(22) PCT Filed: Jul. 29, 2014

(86) PCT No.: PCT/EP2014/066293
§ 371 (c)(1),
(2) Date: Feb. 6, 2016

(87) PCT Pub. No.: WO2015/018694
PCT Pub. Date: Feb. 12, 2015

(65) Prior Publication Data
US 2016/0185351 A1    Jun. 30, 2016

(30) Foreign Application Priority Data

Aug. 7, 2013 (GB) .................................. 1314152.8
Apr. 4, 2014 (GB) .................................. 1406079.2

(51) Int. Cl.
*F16H 61/02*     (2006.01)
*B60W 10/11*     (2012.01)
(Continued)

(52) U.S. Cl.
CPC ........... *F16H 61/0213* (2013.01); *B60R 1/00* (2013.01); *B60W 10/06* (2013.01); *B60W 10/10* (2013.01);
(Continued)

(58) Field of Classification Search
None
See application file for complete search history.

(56) References Cited

U.S. PATENT DOCUMENTS 5,022,509 A * 6/1991 Schweiger ............. B60K 37/06
477/79
6,065,560 A * 5/2000 Palmeri .................. B60K 20/02
180/326
(Continued)

FOREIGN PATENT DOCUMENTS

EP    1266788 A2    12/2002

OTHER PUBLICATIONS

International Search Report corresponding to International application No. PCT/EP2014/066293, dated Oct. 13, 2014, 5 pages.
(Continued)

*Primary Examiner* — Colby M Hansen
(74) *Attorney, Agent, or Firm* — Reising Ethington P.C.

(57) ABSTRACT

Some embodiments of the present invention provide a control system for a motor vehicle having a first user-operable transmission selector means for selecting a forward operating mode of a transmission corresponding to travel in a forward direction and a reverse operating mode of a transmission corresponding to travel in a reverse direction opposite the forward direction, the control system comprising: a user-operable gear selector configured in a first functional mode to, upon receipt of a user input, select between a plurality of forward direction gear ratios, and wherein the user-operable gear selector is re-configured in a
(Continued)

second functional mode to, upon receipt of a user input, select between the forward operating mode and the reverse operating mode.

13 Claims, 10 Drawing Sheets

(51) Int. Cl.

| | | |
|---|---|---|
| *B60R 1/00* | (2006.01) | |
| *B60W 30/182* | (2012.01) | |
| *B60W 10/184* | (2012.01) | |
| *B60W 10/06* | (2006.01) | |
| *B60W 50/12* | (2012.01) | |
| *B60W 10/10* | (2012.01) | |
| *F16H 59/02* | (2006.01) | |
| *B60W 30/18* | (2012.01) | |
| *B60W 50/00* | (2006.01) | |
| *F16H 59/08* | (2006.01) | |
| *B60W 50/14* | (2012.01) | |

(52) U.S. Cl.
CPC .......... *B60W 10/11* (2013.01); *B60W 10/184* (2013.01); *B60W 30/182* (2013.01); *B60W 30/18045* (2013.01); *B60W 50/12* (2013.01); *F16H 59/02* (2013.01); *F16H 61/0204* (2013.01); *B60K 2350/1016* (2013.01); *B60K 2350/928* (2013.01); *B60R 2300/80* (2013.01); *B60W 2050/0095* (2013.01); *B60W 2050/146* (2013.01); *B60W 2510/182* (2013.01); *B60W 2520/04* (2013.01); *B60W 2520/10* (2013.01); *B60W 2540/12* (2013.01); *B60W 2540/16* (2013.01); *B60W 2550/14* (2013.01); *B60W 2710/1005* (2013.01); *B60W 2710/182* (2013.01); *B60W 2720/10* (2013.01); *B60W 2720/403* (2013.01); *F16H 61/0246* (2013.01); *F16H 2059/0221* (2013.01); *F16H 2059/0247* (2013.01); *F16H 2059/088* (2013.01); *F16H 2061/0234* (2013.01); *F16H 2061/0244* (2013.01); *F16H 2312/08* (2013.01)

(56) References Cited

U.S. PATENT DOCUMENTS

| | | | |
|---|---|---|---|
| 7,278,510 B1 * | 10/2007 | Richards | B62D 1/046 180/336 |
| 2003/0097892 A1 * | 5/2003 | Hedman | B60W 10/02 74/335 |
| 2003/0101840 A1 * | 6/2003 | Yoshikawa | B60K 20/06 74/552 |
| 2008/0182718 A1 * | 7/2008 | Ido | F16H 61/16 477/125 |
| 2012/0095657 A1 | 4/2012 | Pudvay | |
| 2013/0297159 A1 * | 11/2013 | Nishida | F16H 61/68 701/52 |
| 2014/0022070 A1 * | 1/2014 | Golomb | B60Q 1/0082 340/475 |
| 2014/0116179 A1 * | 5/2014 | Sata | B60K 20/06 74/473.31 |
| 2015/0267807 A1 * | 9/2015 | Tokumo | F16H 59/08 701/52 |
| 2015/0291167 A1 * | 10/2015 | Mair | B60W 30/18045 701/22 |
| 2015/0291170 A1 * | 10/2015 | Mair | B60W 30/18045 701/1 |

OTHER PUBLICATIONS

International Search Report and Written Opinion corresponding to International application No. PCT/EP2014/066293, dated Oct. 13, 2014, 13 pages.
Combined Search and Examination Report corresponding to application No. GB1406079.2, dated Oct. 22, 2014, 8 pages.

* cited by examiner

| SP = Speed Proportional<br>TM = Towing Mode | | Motorway | Country Road | City Driving | Towing (on Road) | Dirt Track (Developing World Road) | Snow / Ice (Scandinavian / North America Conditions) | Grass/ gravel/ snow | Sand | Rock/ Crawl/ Boulder Crossing | Mud & ruts |
|---|---|---|---|---|---|---|---|---|---|---|---|
| Suspension Ride Height | High | | | | | | | | | X | |
| | Standard | | X | X | X | X | X | X | X | | X |
| | Low | X | | | | | | | | | |
| Side / Side Air Interconnection | Closed | X | X | X | X | X | X | | | | |
| | Open | | | | | | | X | X | X | X |
| Steering Assistance Level | High | SP | SP | SP | SP | SP | SP | SP | SP | | SP |
| | Low | X | X | | | X | X | X | X | X | X |
| Brake Pedal Efforts | High | X | X | X | X | X | X | X | X | X | |
| | Low | | (X) | X | X | | | | | X | |
| A.B.S. Mode | High mu | X | X | | | X | X | X | | | X |
| | Low mu | | | | | | | | X | | |
| | Plough Surface | | | | | | | | | | |
| E.T.C. Mode | High mu | X (2) | X | X | X | X | X | X | | X | X |
| | Low mu | | | | | | | | X | X | |
| D.S.C. Mode | High mu | X | X | X | TM | X | X | X | X | X | X |
| | Low mu | | | | | | | | | | |
| Throttle Progression | Quick | | (X) | | (X) | X | | | | | |
| | Slow | X | X | X | X | X | X | X | | X | X |
| Transfer Box | High Range | X | X | X | X | X | X | X | X | X | X |
| | Low Range | | | | | | | | | | |
| Auto Transmission | Normal Mode | X | | X | X | X | X | | | | |
| | Performance Mode | | X | | | | | | | | |
| | Snow Mode | | | | | | | X | | | X |
| | Sand Mode | | | | | | | | X | | |
| | Manual Mode | | (X) | | | | | | | X | X |
| Centre Diff Lock | Open | X | X | X | X | X | X | X | X | X | X |
| | Locked | | | | | | | | | | |
| Rear Diff Lock | Open | X | X | X | X | X | X | X | (X) | X | X |
| | Locked | | | | | | | | | | |

FIGURE 3

VEHICLE CONTROL SYSTEM AND METHOD

INCORPORATION BY REFERENCE

The entire contents of co-pending UK patent application numbers GB2492748, GB2492655 and GB2499252, UK patents GB2325716, GB2308415, GB2341430, GB2382158 and GB2381597, US2003/0200016 and WO2014/037540 are expressly incorporated herein by reference.

FIELD OF THE INVENTION

The present invention relates to a vehicle control system for one or more vehicle subsystems and to a method of controlling one or more vehicle subsystems.

BACKGROUND

It is known to provide a vehicle having a plurality of subsystems which can be operated in different configurations to suit different driving conditions. For example, automatic transmissions may be controlled in a variety of modes such as sport, manual, winter or economy. In each mode, subsystem control parameters such as accelerator pedal response and conditions under which changes between gear ratios take place may be modified so as to suit the conditions of the terrain or the particular taste of the driver. It is also known to provide air suspensions with on-road and off-road modes. Stability control systems can be operated at reduced activity in certain modes so as to give the driver more direct control, and power steering systems can be operated in different modes to provide a varying level of assistance depending on driving conditions.

In a known vehicle control system allowing selection of control modes optimised for different driving conditions, mode selection is entirely manual. The control system (which may also be referred to as a terrain response (TR) control system) responds to a user request for operation in a given control mode according to the position of a control knob. If the control knob has been left in a given mode (such as a grass/gravel/snow (GGS) mode) at key-off then the control system will assume the GGS mode at the next key-on, unless the control knob has been adjusted. Thus the position of the control knob determines the control mode that will be assumed by the controller.

It is also known to provide a vehicle control system with automatic mode selection functionality. In vehicles having this functionality it is known to provide a multi-stable rotary knob for mode selection. In some vehicles the physical position of the knob is not indicative of selected mode.

It is also known to provide a vehicle control system in which a multi-stable rotary knob for selecting an operating mode of a vehicle automatic transmission.

It is desirable to provide an improved control system for a motor vehicle.

STATEMENT OF THE INVENTION

Embodiments of the invention may be understood with reference to the appended claims.

Aspects of the present invention provide a control system, a vehicle and a method.

Control systems according to embodiments of the present invention are suitable for a range of different vehicles including conventional engine-only vehicles, electric vehicles, and/or hybrid electric vehicles.

In one aspect of the invention for which protection is sought there is provided a control system for a motor vehicle having a first user-operable transmission selector means for selecting a forward operating mode of a transmission corresponding to travel in a forward direction and a reverse operating mode of a transmission corresponding to travel in a reverse direction opposite the forward direction, the control system comprising:

a user-operable gear selector configured in a first functional mode to, upon receipt of a user input, select between a plurality of forward direction gear ratios, and wherein the user-operable gear selector is re-configured in a second functional mode to, upon receipt of a user input, select between the forward operating mode and the reverse operating mode.

Embodiments of the present invention have the advantage that a user may employ the user-operable gear selector to cause a transmission to switch between a plurality of forward direction gear ratios under certain driving conditions, and to switch between forward and reverse operating modes under certain other driving conditions, as required. A convenience with which a user may cause a reversal in vehicle direction of travel may therefore be enhanced.

Optionally the control system is arranged control system according to claim 1 wherein the user-operable gear selector is further configured to allow a user to select a neutral transmission operating mode in which a transmission does not allow drive torque to be transmitted to a driveline.

The control system may be arranged wherein the user-operable gear selector may be configured to switch sequentially, in either direction, between the reverse operating mode, the neutral operating mode, and the forward operating mode in response to user operation thereof.

The sequential toggling between the three selectable transmission modes ensures that a user must select the neutral transmission operating mode by means of the user-operable gear selector before a user may select by means of the user-operable gear selector a transmission mode corresponding to travel in a direction opposite that corresponding to the instantly selected transmission operating mode.

Optionally, the user-operable gear selector comprises first and second input selectors, wherein in the second mode of operation the first input selector is operable upon receipt of a user input, to cause a transmission to switch from the reverse mode of operation to the forward mode of operation, and the second input selector is operable, upon receipt of a user input, to cause the transmission to switch from the forward mode of operation to the reverse mode of operation.

It is to be understood that by the term instantly selected is meant a transmission mode that is selected at a given moment in time. Thus, if the transmission is operating in the forward transmission operating mode at a given moment in time, a user must select the neutral operating mode before the reverse transmission operating mode may be selected. Similarly, if the transmission is operating in the reverse transmission operating mode at a given moment in time, a user must select the neutral operating mode before the forward transmission operating mode may be selected.

The control system may be configured wherein the first and second input selectors of the user-operable gear selector each comprise a user-actuated switch device.

Optionally, the first and second input selectors each comprise a paddle switch device.

It is to be understood that paddle switch devices (or 'paddle shift' devices) are known, and may be mounted to a steering wheel of a vehicle in some known vehicles.

Optionally, the user-operable gear selector is mounted to one of a steering wheel of a vehicle and a steering column of a vehicle.

Optionally, the system further comprises a first user-operable transmission selector means for selecting said forward operating mode of a transmission corresponding to travel in a forward direction and said reverse operating mode of a transmission corresponding to travel in a reverse direction opposite the forward direction.

Optionally, when the control system is operated in the second functional mode the first transmission selector means is unable to cause a change in transmission operating mode.

This feature has the advantage that a user may not inadvertently cause a change in transmission operating mode if the first selector means is actuated accidentally when the control system is in the second predetermined function mode.

Optionally, the system comprises a first user-operable transmission selector means for selecting said forward operating mode of transmission corresponding to travel in a forward direction and said reverse operating mode of a transmission corresponding to travel in a reverse direction opposite the forward direction, and wherein said first user-operable transmission selector means comprises an input lever movable between positions corresponding to a reverse, a neutral and a forward park operating mode of transmission and a second range of movement in which in said first functional mode it is configured to toggle between a plurality of forward direction gear ratios, and wherein in said second functional mode it is configured to toggle between the forward operating mode and the reverse operating mode.

In a further aspect of the invention for which protection is sought there is provided a vehicle comprising a control system according to another aspect of the invention.

In a further aspect of the invention for which protection is sought there is provided a vehicle comprising a body, a plurality of wheels, a powertrain comprising a transmission to drive said wheels, a braking system to brake said wheels, and a system according to another aspect of the invention.

In a further aspect of the invention for which protection is sought there is provided a method of controlling a motor vehicle implemented by a control system, the method comprising:

allowing a first user-operable transmission selector means to select a forward operating mode of a transmission corresponding to travel in a forward direction and a reverse operating mode of a transmission corresponding to travel in a reverse direction opposite the forward direction, in a first functional mode, allowing a user-operable gear selector to, upon receipt of a user input, select between a plurality of forward direction gear ratios, and re-configuring the user-operable gear selector in a second functional mode to, upon receipt of a user input, select between the forward operating mode and the reverse operating mode.

The method may comprise allowing a user to select a neutral transmission operating mode in which a transmission does not allow drive torque to be transmitted to a driveline, by means of the first user-operable transmission selector means and the user-operable gear selector.

Optionally, the method further comprises allowing a user to cause a transmission to toggle between the neutral transmission operating mode and the forward transmission operating mode and between the neutral transmission operating mode and the reverse transmission operating mode by means of the user-operable gear selector, whereby when a transmission is in the forward or reverse operating modes, a user must select the neutral transmission operating mode by means of the user-operable gear selector before a user may select by means of the user-operable gear selector a transmission mode corresponding to travel in a direction opposite that corresponding to the instantly selected transmission operating mode.

In one aspect of the invention for which protection is sought there is provided a carrier medium carrying computer readable code for controlling a vehicle to carry out the method of another aspect.

In one aspect of the invention for which protection is sought there is provided a computer program product executable on a processor so as to implement the method of another aspect.

In one aspect of the invention for which protection is sought there is provided a computer readable medium loaded with the computer program product of another aspect.

In one aspect of the invention for which protection is sought there is provided a processor arranged to implement the method of another aspect.

It is to be understood that the control system may comprise one or more controllers for implementing the functions of the control system. It is to be understood that the controller or controllers may comprise a control unit or computational device having one or more electronic processors. The system may comprise a single control unit or electronic controller or alternatively different functions of the controller may be embodied in, or hosted in, different control units or controllers. As used herein the term "control unit" will be understood to include both a single control unit or controller and a plurality of control units or controllers collectively operating to provide the stated control functionality. A set of instructions could be provided which, when executed, cause said computational device to implement the control techniques described herein. The set of instructions could be embedded in said one or more electronic processors. Alternatively, the set of instructions could be provided as software to be executed on said computational device. The controller may be implemented in software run on one or more processors. One or more other controllers may be implemented in software run on one or more processors, optionally the same one or more processors as the controller. Other arrangements are also useful.

Within the scope of this application it is expressly envisaged that the various aspects, embodiments, examples and alternatives set out in the preceding paragraphs, in the claims and/or in the following description and drawings, and in particular the individual features thereof, may be taken independently or in any combination. Features described in connection with one embodiment are applicable to all embodiments, unless such features are incompatible.

For the avoidance of doubt, it is to be understood that features described with respect to one aspect of the invention may be included within any other aspect of the invention, alone or in appropriate combination with one or more other features.

BRIEF DESCRIPTION OF THE DRAWINGS

One or more embodiments of the invention will now be described, by way of example only, with reference to the accompanying figures in which:

FIG. 3 is a table showing which vehicle subsystem configuration mode is selected in each respective vehicle operating mode;

DETAILED DESCRIPTION

Figure 1:
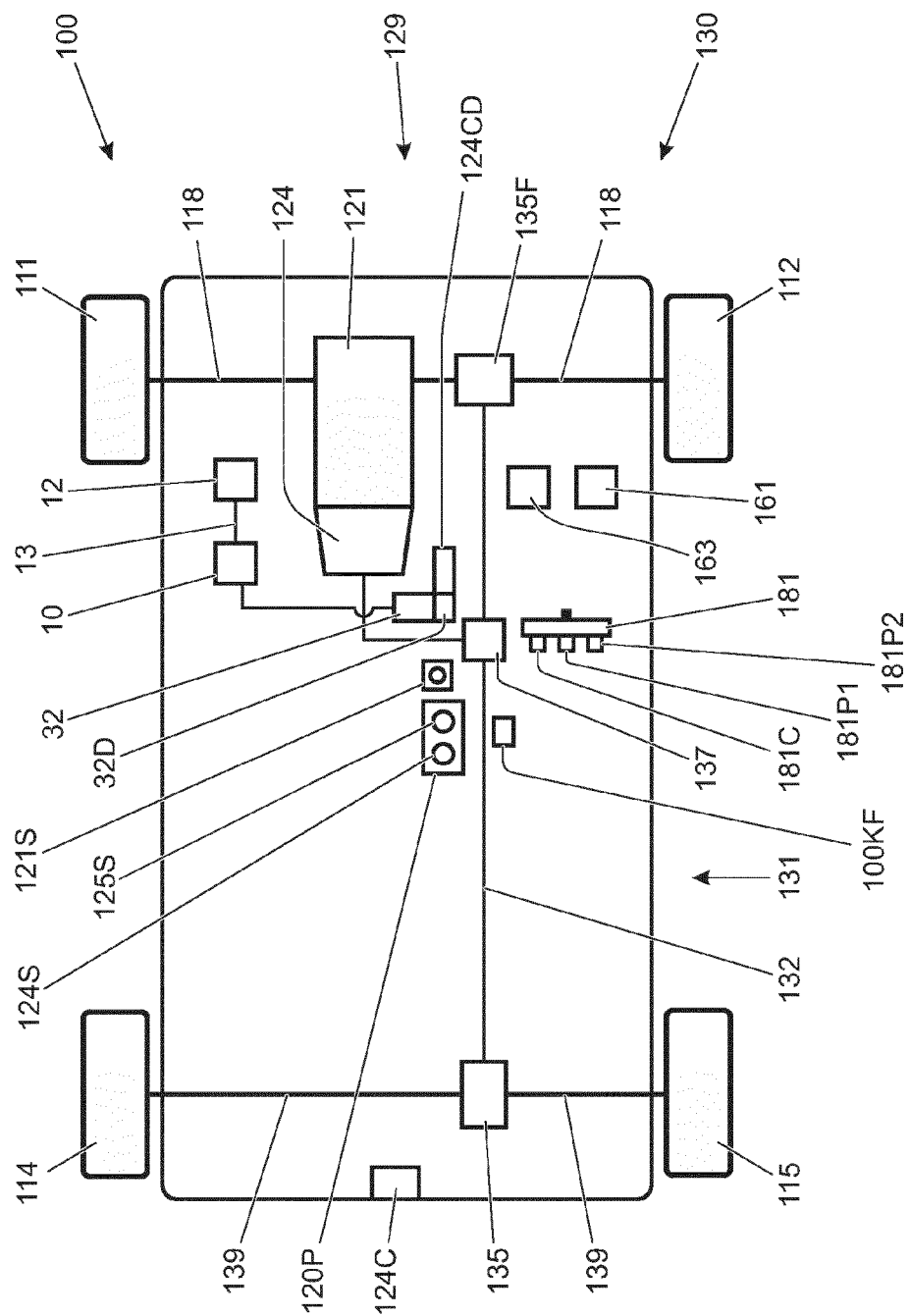
FIG. 1 is a schematic illustration of a vehicle according to an embodiment of the present invention.

FIG. 1 shows a vehicle 100 according to an embodiment of the invention intended to be suitable for off-road use, that is for use on terrains other than regular tarmac road, as well as on-road. The vehicle 100 has a powertrain 129 that includes an engine 121 that is connected to a driveline 130 having a transmission 124. In the embodiment shown the transmission 124 is an automatic transmission 124. The transmission 124 is operable to assume one of five operating modes: a park mode (P), a reverse driving mode (R), a neutral mode (N), a forward driving mode (D) and a sport driving mode (S). The required mode is selected by means of a transmission operating mode rotary selector dial 124S. The selector dial 124S is configured to assume a retracted position in which an upper surface of the dial 124S is substantially flush with a centre console panel 120P in which the dial 124S is mounted, and a deployed position in which the dial 124S extends out from the panel 120P so as to allow a user to grasp the dial 124S and rotate the dial to a desired rotational position to select the required transmission operating mode. A display 124SD associated with and adjacent the transmission selector dial 124S displays an indication of the currently selected operating mode by illuminating a letter 'P', 'N', 'R', 'D' or 'S' in dependence on the currently selected operating mode.

The vehicle 100 is configured such that the dial 124S assumes the deployed condition when a vehicle start operation is performed. In the present embodiment the start operation may be performed when a start button 121S is pressed and a driver key fob 100KF is detected to be present by a central controller referred to as a vehicle control unit (VCU) 10. In the present embodiment, when the start operation is performed the engine 121 is started. In some embodiments, when the start operation is performed the vehicle 100 is placed in a condition in which the engine 121 is started automatically as soon as the driver selects a reverse or forward driving mode and either a brake pedal 163 is released, or an accelerator pedal 161 is depressed. Other arrangements may also be useful.

In the park mode the engine 121 is decoupled from the driveline 131 and a park pawl of the transmission 124 causes an output shaft of the transmission 124 to assume a locked condition in which it cannot rotate, thereby locking the driveline 131 in a condition in which it also cannot rotate. In the reverse driving mode, a reverse gear of the transmission 124 is selected. In the neutral mode, no driving gear is selected and the transmission does not couple engine drive torque to the driveline. In the forward driving mode a forward gear of the transmission 124 is selected. In the sport driving mode, a forward gear of the transmission 124 is selected but a number of vehicle parameters are changed in order to deliver a more 'sporty' or performance-oriented driving experience in a known manner. It is to be understood that reference herein to the forward driving mode does not include reference to the sport mode.

Embodiments of the present invention are also suitable for use in vehicles with a manual transmission, continuously variable transmission or any other suitable transmission.

The driveline 130 is arranged to drive a pair of front vehicle wheels 111,112 by means of a front differential 135F and a pair of front drive shafts 118. The driveline 130 also comprises an auxiliary driveline portion 131 arranged to drive a pair of rear wheels 114, 115 by means of an auxiliary driveshaft or prop-shaft 132, a rear differential 135 and a pair of rear driveshafts 139. Embodiments of the invention are suitable for use with vehicles in which the transmission is arranged to drive only a pair of front wheels or only a pair of rear wheels (i.e. front wheel drive vehicles or rear wheel drive vehicles) or selectable two wheel drive/four wheel drive vehicles. In the embodiment of FIG. 1 the transmission 124 is releasably connectable to the auxiliary driveline portion 131 by means of a power transfer unit (PTU) 137, allowing selectable two wheel drive or four wheel drive operation. It is to be understood that embodiments of the invention may be suitable for vehicles having more than four wheels or where only two wheels are driven, for example two wheels of a three wheeled vehicle or four wheeled vehicle or a vehicle with more than four wheels.

The PTU 137 is operable in a 'high ratio' (HI) or a 'low ratio' (LO) configuration, in which a gear ratio between an input shaft and an output shaft thereof is selected to be a high or low ratio. The high ratio configuration is suitable for general on-road or 'on-highway' operations whilst the low ratio configuration is more suitable for negotiating certain off-road terrain conditions and other low speed applications such as towing.

As noted above the vehicle 100 has an accelerator pedal 161 and a brake pedal 163. The vehicle also has a steering wheel 181, the steering wheel 181 having a cruise control selector button 181C mounted thereto for activating a cruise control system 11. The steering wheel 181 also has first and second monostable paddle input controls 181P1, 181P2 operable to cause the transmission 124 to switch to a lower forward gear relative to a currently (instantly) selected gear by means of the first paddle input control and a higher forward gear relative to a currently selected gear by means of the second paddle input control in a known manner. In the present embodiment the paddle input controls 181P1, 181P2 are also operable to select between forward and reverse gears when certain predetermined conditions are met, as described in more detail below.

As noted above, the vehicle 100 has a central controller, referred to as the vehicle control unit (VCU) 10. The VCU 10 receives and outputs a plurality of signals to and from various sensors and subsystems 12 provided on the vehicle 100.

Figure 2:
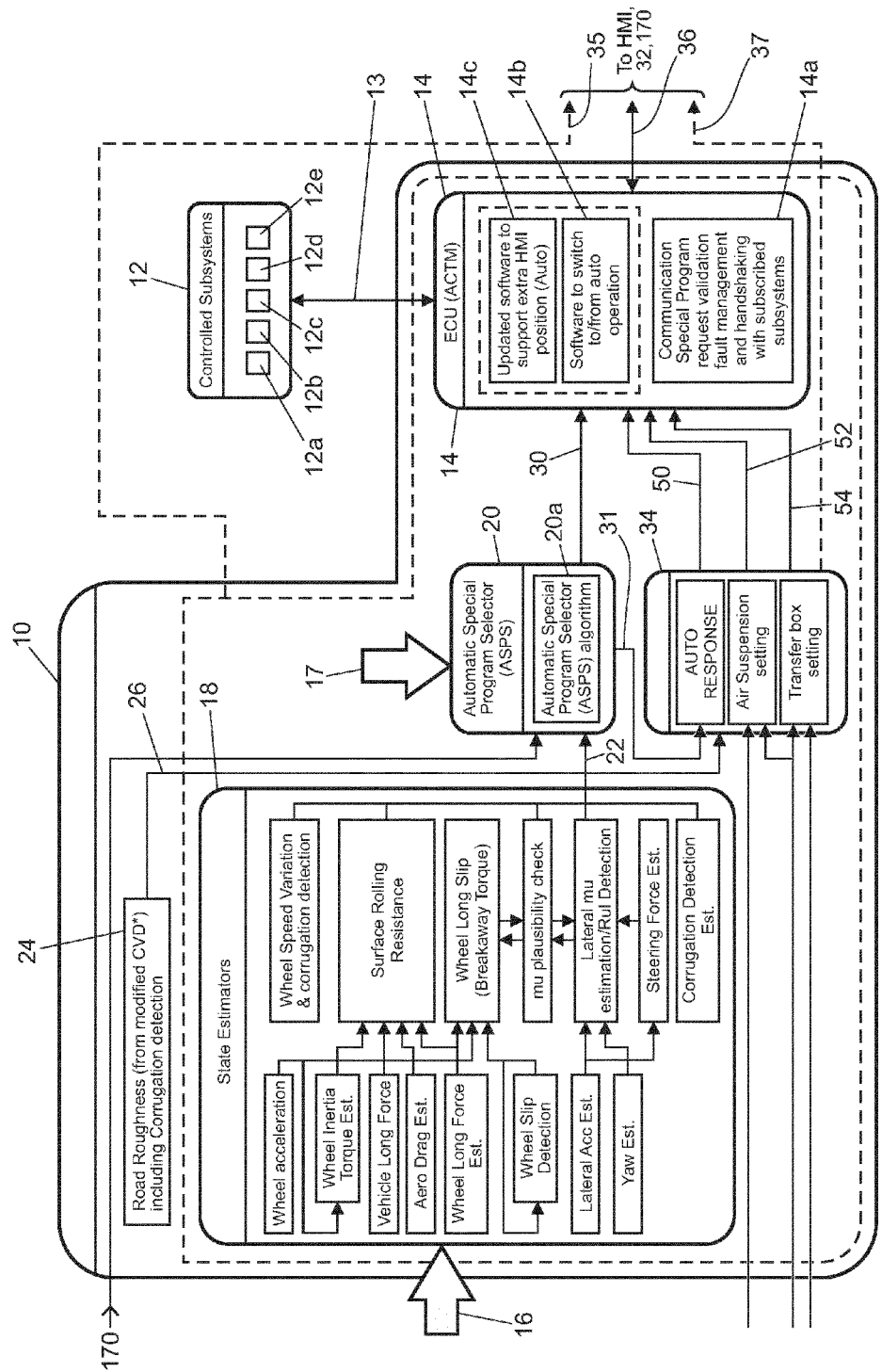
FIG. 2 is a block diagram to illustrate a vehicle control system in accordance with an embodiment of the invention, including various vehicle subsystems under the control of the vehicle control system.

FIG. 2 shows the VCU 10 in more detail. The VCU 10 controls a plurality of vehicle subsystems 12 including, but not limited to, an engine management system 12a, a transmission system 12b, an electronic power assisted steering unit 12c (ePAS unit), a brakes system 12d and a suspension system 12e. Although five subsystems are illustrated as being under the control of the VCU 10, in practice a greater number of vehicle subsystems may be included on the vehicle 100 and may be under the control of the VCU 10. The VCU 10 includes a subsystem control module 14 which provides control signals via line 13 to each of the vehicle subsystems 12 to initiate control of the subsystems in a manner appropriate to the driving condition, such as the terrain, in which the vehicle is travelling (referred to as the terrain condition). The subsystems 12 also communicate with the subsystems control module 14 via signal line 13 to feedback information on subsystem status. In some embodiments, instead of an ePAS unit 12c, a hydraulically operated power steering unit may be provided.

The VCU 10 receives a plurality of signals, represented generally at 16 and 17, which are received from a plurality of vehicle sensors and are representative of a variety of different parameters associated with vehicle motion and status. As described in further detail below, the signals 16, 17 provide, or are used to calculate, a plurality of driving condition indicators (also referred to as terrain indicators) which are indicative of the nature of the condition in which the vehicle is travelling. One advantageous feature of some embodiments of the present invention is that the VCU 10 determines the most appropriate control mode for the various subsystems on the basis of the terrain indicators, and automatically controls the subsystems accordingly. That is, the VCU 10 determines the most appropriate control mode on the basis of the terrain indicators and automatically causes each of the subsystems 12 to operate in the respective subsystem configuration mode corresponding to that control mode.

The sensors (not shown) on the vehicle include, but are not limited to, sensors which provide continuous sensor outputs 16 to the VCU 10, including wheel speed sensors, an ambient temperature sensor, an atmospheric pressure sensor, tyre pressure sensors, sensors to detect yaw, roll and pitch of the vehicle, a vehicle speed sensor, a longitudinal acceleration sensor, an engine torque sensor (or engine torque estimator), a steering angle sensor, a steering wheel speed sensor, a gradient sensor (or gradient estimator), a lateral acceleration sensor (part of a stability control system (SCS)), a brake pedal position sensor, an acceleration pedal position sensor and longitudinal, lateral, vertical motion sensors.

In other embodiments, only a selection of the aforementioned sensors may be used. The VCU 10 also receives a signal from the electronic power assisted steering unit (ePAS unit 12c) of the vehicle to indicate the steering force that is applied to the wheels (steering force applied by the driver combined with steering force applied by the ePAS unit 12c).

The vehicle 100 is also provided with a plurality of sensors which provide discrete sensor output signals 17 to the VCU 10, including a cruise control status signal (ON/OFF), a transfer box or PTU 137 status signal (whether the gear ratio is set to a HI range or a LO range), a Hill Descent Control (HDC) status signal (ON/OFF), a trailer connect status signal (ON/OFF), a signal to indicate that the Stability Control System (SCS) has been activated (ON/OFF), a windscreen wiper signal (ON/OFF), an air suspension ride-height status signal (HI/LO), and a Dynamic Stability Control (DSC) signal (ON/OFF).

The VCU 10 includes an evaluation means in the form of an estimator module or processor 18 and a calculation and selection means in the form of a selector module or processor 20. Initially the continuous outputs 16 from the sensors are provided to the estimator module 18 whereas the discrete signals 17 are provided to the selector module 20.

Within a first stage of the estimator module 18, various ones of the sensor outputs 16 are used to derive a number of terrain indicators. In a first stage of the estimator module 18, a vehicle speed is derived from the wheel speed sensors, wheel acceleration is derived from the wheel speed sensors, the longitudinal force on the wheels is derived from the vehicle longitudinal acceleration sensor, and the torque at which wheel slip occurs (if wheel slip occurs) is derived from the motion sensors arranged to detect yaw, pitch and roll. Other calculations performed within the first stage of the estimator module 18 include the wheel inertia torque (the torque associated with accelerating or decelerating the rotating wheels), "continuity of progress" (the assessment of whether the vehicle is starting and stopping, for example as may be the case when the vehicle is travelling over rocky terrain), aerodynamic drag, yaw rate, and lateral vehicle acceleration.

The estimator module 18 also includes a second stage in which the following terrain indicators are calculated: surface rolling resistance (based on the wheel inertia torque, the longitudinal force on the vehicle, aerodynamic drag, and the longitudinal force on the wheels), the steering force on the steering wheel 181 (based on the lateral acceleration and the output from the steering wheel sensor), the wheel longitudinal slip (based on the longitudinal force on the wheels, the wheel acceleration, SCS activity and a signal indicative of whether wheel slip has occurred), lateral friction (calculated from the measured lateral acceleration and the yaw versus the predicted lateral acceleration and yaw), and corrugation detection (high frequency, low amplitude wheel height excitement indicative of a washboard type surface).

The SCS activity signal is derived from several outputs from an SCS ECU (not shown), which contains the DSC (Dynamic Stability Control) function, the TC (Traction Control) function, ABS and HDC algorithms, indicating DSC activity, TC activity, ABS activity, brake interventions on individual wheels, and engine torque reduction requests from the SCS ECU to the engine. All these indicate a slip event has occurred and the SCS ECU has taken action to control it. The estimator module 18 also uses the outputs from the wheel speed sensors to determine a wheel speed variation and corrugation detection signal.

On the basis of the windscreen wiper signal (ON/OFF), the estimator module 18 also calculates how long the windscreen wipers have been in an ON state (i.e. a rain duration signal).

The VCU 10 also includes a road roughness module 24 for calculating the terrain roughness based on the air suspension sensors (the ride height sensors) and the wheel accelerometers. A terrain indicator signal in the form of a roughness output signal 26 is output from the road roughness module 24.

The estimates for the wheel longitudinal slip and the lateral friction estimation are compared with one another within the estimator module 18 as a plausibility check.

Calculations for wheel speed variation and corrugation output, the surface rolling resistance estimation, the wheel longitudinal slip and the corrugation detection, together with the friction plausibility check, are output from the estimator module 18 and provide terrain indicator output signals 22, indicative of the nature of the terrain in which the vehicle is travelling, for further processing within the VCU 10.

The terrain indicator signals 22 from the estimator module 18 are provided to the selector module 20 for determining which of a plurality of vehicle subsystem control modes (and therefore corresponding subsystem configuration modes) is most appropriate based on the indicators of the type of terrain in which the vehicle is travelling. The most appropriate control mode is determined by analysing the probability that each of the different control modes is appropriate on the basis of the terrain indicator signals 22, 26 from the estimator module 18 and the road roughness module 24.

Figure 4:
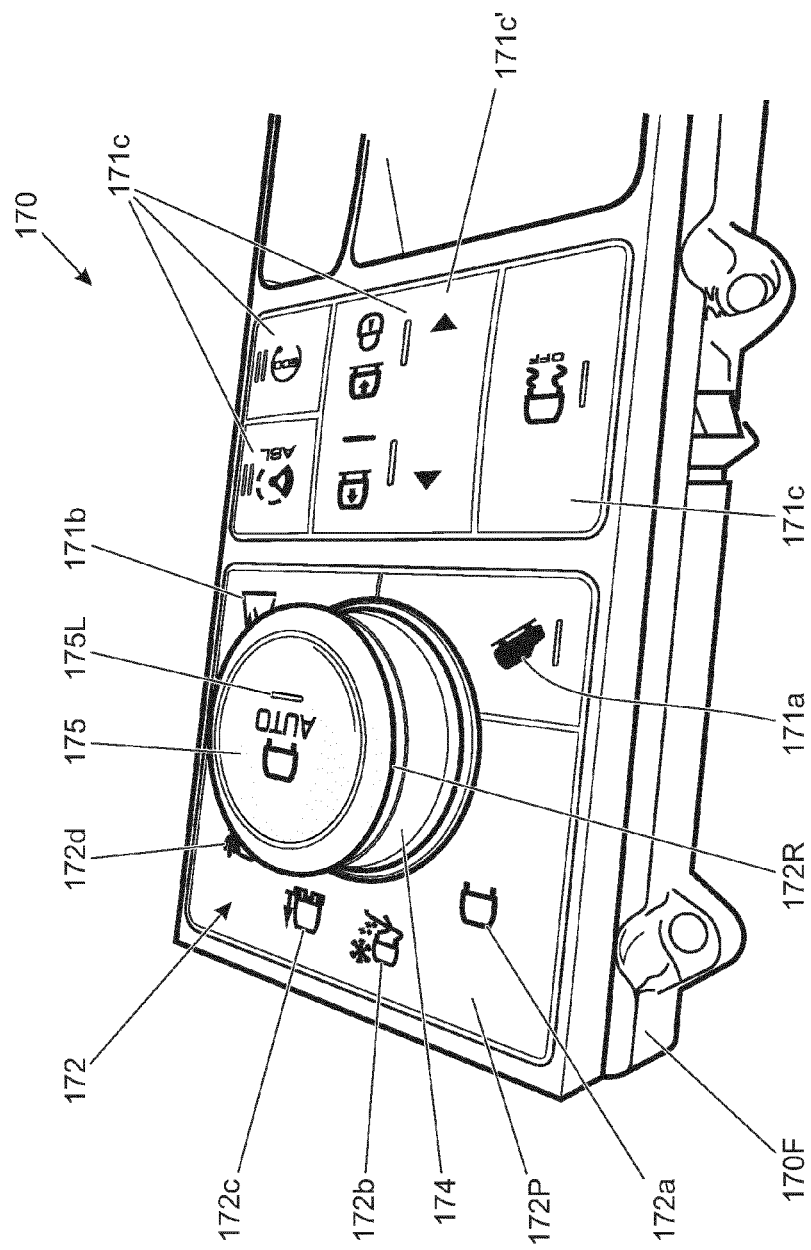
FIG. 4 is a schematic illustration of a switchpack according to an embodiment of the invention with a rotary knob in a deployed condition.

The vehicle subsystems 12 may be controlled automatically in a given subsystem control mode (in an "automatic mode" or "automatic condition" of operation of the VCU 10) in response to a control output signal 30 from the selector module 20 and without the need for driver input. Alternatively, the vehicle subsystems 12 may be operated in a given subsystem control mode according to a manual user input (in a "manual mode" or "manual condition" of operation of the VCU 10) via a Human Machine Interface (HMI) module 32. Thus the user determines in which subsystem control mode the subsystems will be operated by selection of a required system control mode (operating mode). The HMI module 32 comprises a touch-sensitive display screen 32D and a user operable switchpack 170 (FIG. 4). The user may select between the manual and automatic modes (or conditions) of operation of the VCU 10 via the switchpack 170. When the VCU 10 is operating in the manual mode or condition, the switchpack 170 also allows the user to select the desired subsystem control mode.

It is to be understood that the subsystem controller 14 may itself control the vehicle subsystems 12a-12e directly via the signal line 13, or alternatively each subsystem may be provided with its own associated intermediate controller (not shown in FIG. 1) for providing control of the relevant subsystem 12a-12e. In the latter case the subsystem controller 14 may only control the selection of the most appropriate subsystem control mode for the subsystems 12a-12e, rather than implementing the actual control steps for the subsystems. The or each intermediate controller may in practice form an integral part of the main subsystem controller 14.

When operating in the automatic mode, the selection of the most appropriate subsystem control mode may be achieved by means of a three phase process:
(1) for each type of control mode, a calculation is performed of the probability that the control mode is suitable for the terrain over which the vehicle is travelling, based on the terrain indicators;
(2) the integration of "positive differences" between the probability for the current control mode and the other control modes; and
(3) the program request to the control module 14 when the integration value exceeds a predetermined threshold or the current terrain control mode probability is zero.

The specific steps for phases (1), (2) and (3) will now be described in more detail.

In phase (1), the continuous terrain indicator signals in the form of the road surface roughness output 26 and the outputs 22 from the estimator module 18 are provided to the selector module 20. The selector module 20 also receives the discrete terrain indicators 17 directly from various sensors on the vehicle, including the transfer box status signal (whether the gear ratio is set to a HI range or a LO range), the DSC status signal, cruise control status (whether the vehicle's cruise control system 11 is ON or OFF), and trailer connect status (whether or not a trailer is connected to the vehicle). Terrain indicator signals indicative of ambient temperature and atmospheric pressure are also provided to the selector module 20.

The selector module 20 is provided with a probability algorithm 20a for calculating the most suitable control mode for the vehicle subsystems based on the discrete terrain indicator signals 17 received directly from the sensors and the continuous terrain indicators 22, 26 calculated by the estimator module 18 and the road surface roughness module 24, respectively. That is, the probability algorithm 20a calculates the most suitable system control mode, which determines the respective subsystem configuration mode in which each subsystem is to be operated, based on the discrete terrain indicator signals 17.

The control modes typically include a grass/gravel/snow control mode (GGS mode) that is suitable for when the vehicle is travelling in grass, gravel or snow terrain, a mud/ruts control mode (MR mode) which is suitable for when the vehicle is travelling in mud and ruts terrain, a rock crawl/boulder mode (RB mode) which is suitable for when the vehicle is travelling in rock or boulder terrain, a sand mode which is suitable for when the vehicle is travelling in sand terrain (or deep soft snow) and a special programs OFF mode (SP OFF mode or SPO mode) which is a suitable compromise mode, or general mode, for all terrain conditions and especially vehicle travel on motorways and regular roadways. Many other control modes are also envisaged including those disclosed in US2003/0200016, the content of which is hereby incorporated by reference.

The different terrain types are grouped according to the friction of the terrain and the roughness of the terrain. For example, it is appropriate to group grass, gravel and snow together as terrains that provide a low friction, smooth surface and it is appropriate to group rock and boulder terrains together as high friction, very high roughness terrains.

FIG. 3 is a table taken from US2003/0200016 showing the particular sub-system configuration modes assumed by the subsystems 12 of the vehicle 100 in the respective different operating modes in which the VCU 10 may operate.

The operating modes are:
(a) A motorway (or highway) mode also referred to as special programs off (SPO) mode;
(b) A country road mode;
(c) A city driving (urban) mode;
(d) A towing (on-road) mode;
(e) A dirt track mode;
(f) A snow/ice (on-road) mode;
(g) A GGS mode;
(h) A sand mode;
(i) A rock crawl or boulder crossing (RC) mode; and
(j) A mud/ruts (MR) mode With reference to FIG. 3, the configuration of the suspension system 12e is specified in terms of ride height (high, standard or low) and side/side air interconnection. The suspension system 12e is a fluid suspension system, in the present embodiment an air suspension system, allowing fluid interconnection between suspensions for wheels on opposite sides of the vehicle in the manner described in US2003/0200016. The plurality of subsystem configuration modes provide different levels of said interconnection, in the present case no interconnection (interconnection closed) and at least partial interconnection (interconnection open).

The configuration of the ePAS steering unit 12c may be adjusted to provide different levels of steering assistance, wherein steering wheel 181 is easier to turn the greater the amount of steering assistance. The amount of assistance may be proportional to vehicle speed in some operating modes.

The brakes system 12d may be arranged to provide relatively high brake force for a given amount of pressure applied to the brake pedal 163 or a relatively low brake force, depending on the operating mode.

The brakes system 12d may also be arranged to allow different levels of wheel slip when an anti-lock braking system is active, (relatively low amounts on low friction ("low-mu" surfaces) and relatively large amounts on high friction surfaces).

An electronic traction control (ETC) system may be operated in a high mu or low mu configuration, the system tolerating greater wheel slip in the low mu configuration before intervening in vehicle control compared with a high mu configuration.

A dynamic stability control system (DSC) may also be operated in a high mu or low mu configuration.

The engine management system 12a may be operated in 'quick' or 'slow' accelerator (or throttle) pedal progression configuration modes in which an increase in engine torque as a function of accelerator pedal progression is relatively quick or slow, respectively. The rate may be dependent on speed in one or more modes such as Sand mode.

The PTU 137 may be operated in a high range (HI) subsystem configuration mode or low range (LO) subsystem configuration mode as described herein.

The transmission 124 may be operated in a "normal" mode that provides a reasonable compromise between fuel economy and driving performance, a "performance" mode which generally keeps the transmission in lower gears than in the normal mode, particularly when the driver is requesting a high level of driving torque to accelerate the vehicle, and a "manual" mode in which the control of gear changes is given completely to the driver. There is also a "snow" or "ice" mode which generally keeps the transmission in higher gears than the normal mode, in particular under acceleration from rest, to avoid loss of traction due to wheel spin, and a "sand" mode which keeps the transmission in relatively high gears at low speed to avoid excessive wheel spin. Excessive wheel spin can result in the wheels digging themselves into the sand at low speeds. However, the sand mode uses relatively low gears at higher speeds where a relatively high degree of wheel slip can be desirable to provide maximum traction. Lower gearing also helps the engine 121 to remain in an operating region where the engine speed is high and the power output is high, thereby helping to avoid the vehicle 100 becoming "bogged down" by a lack of power.

In some embodiments, a centre differential and a rear differential 135 each include a clutch pack and are controllable to vary the degree of locking between a "fully open" and a "fully locked" state. The actual degree of locking at any one time may be controlled on the basis of a number of factors in a known manner, but the control can be adjusted so that the differentials are "more open" or "more locked". Specifically the pre-load on the clutch pack can be varied which in turn controls the locking torque, i.e. the torque across the differential that will cause the clutch, and hence the differential, to slip. A front differential 135F could also be controlled in the same or similar way.

For each subsystem control mode, the algorithm 20a within the selector module 20 performs a probability calculation, based on the terrain indicators, to determine a probability that each of the different control modes is appropriate. The selector module 20 includes a tuneable data map which relates the continuous terrain indicators 22, 26 (e.g. vehicle speed, road roughness, steering angle) to a probability that a particular control mode is appropriate. Each probability value typically takes a value of between 0 and 1. So, for example, the vehicle speed calculation may return a probability of 0.7 for the RB mode if the vehicle speed is relatively slow, whereas if the vehicle speed is relatively high the probability for the RB mode will be much lower (e.g. 0.2). This is because it is much less likely that a high vehicle speed is indicative that the vehicle is travelling over a rock or boulder terrain.

In addition, for each subsystem control mode, each of the discrete terrain indicators 17 (e.g. trailer connection status ON/OFF, cruise control status ON/OFF) is also used to calculate an associated probability for each of the control modes, GGS, RB, Sand, MR or SP OFF. So, for example, if cruise control is switched on by the driver of the vehicle, the probability that the SP OFF mode is appropriate is relatively high, whereas the probability that the MR control mode is appropriate will be lower.

For each of the different sub-system control modes, a combined probability value, Pb, is calculated based on the individual probabilities for that control mode, as described above, as derived from each of the continuous or discrete terrain indicators 17, 22, 26. In the following equation, for each control mode the individual probability as determined for each terrain indicator is represented by a, b, c, d . . . n. The combined probability value, Pb, for each control mode is then calculated as follows:

$$Pb=(a.b.c.d \ldots n)/((a.b.c.d \ldots n)+(1-a).(1-b).(1-c).(1-d) \ldots (1-n))$$

Any number of individual probabilities may be input to the probability algorithm 20a and any one probability value input to the probability algorithm may itself be the output of a combinational probability function.

Once the combined probability value for each control mode has been calculated, the subsystem control program corresponding to the control mode with the highest probability is selected within the selector module 20 and an output signal 30 providing an indication of this is provided to the subsystem control module 14. The benefit of using a combined probability function based on multiple terrain indicators is that certain indicators may make a control mode (e.g. GGS or MR) more or less likely when combined together, compared with basing the selection on just a single terrain indicator alone.

A further control signal 31 from the selector module 20 is provided to a control module 34.

In phase (2), an integration process is implemented continually within the selector module 20 to determine whether it is necessary to change from the current control mode to one of the alternative control modes.

The first step of the integration process is to determine whether there is a positive difference between the combined probability value for each of the alternative control modes compared with the combined probability value for the current control mode.

By way of example, assume the current control mode is GGS with a combined probability value of 0.5. If a combined probability value for the sand control mode is 0.7, a positive difference is calculated between the two probabilities (i.e. a positive difference value of 0.2). The positive difference value is integrated with respect to time. If the difference remains positive and the integrated value reaches a predetermined change threshold (referred to as the change threshold), or one of a plurality of predetermined change thresholds, the selector module 20 determines that the current terrain control mode (for GGS) is to be updated to a new, alternative control mode (in this example, the sand control mode). A control output signal 30 is then output from the selector module 20 to the subsystem control module 14 to initiate the sand control mode for the vehicle subsystems.

In phase (3), the probability difference is monitored and if, at any point during the integration process, the probability difference changes from a positive value to a negative value, the integration process is cancelled and reset to zero. Similarly, if the integrated value for one of the other alternative control modes (i.e. other than sand), reaches the predetermined change threshold before the probability result for the sand control mode, the integration process for the sand control mode is cancelled and reset to zero and the other alternative control mode, with a higher probability difference, is selected.

HDC Interaction

As described above, the vehicle 100 has an HMI module 32 comprising a user operable switchpack 170 shown schematically in FIG. 4. The switchpack 170 allows a user to toggle the VCU 10 between the automatic and manual conditions of operation.

Figure 5:
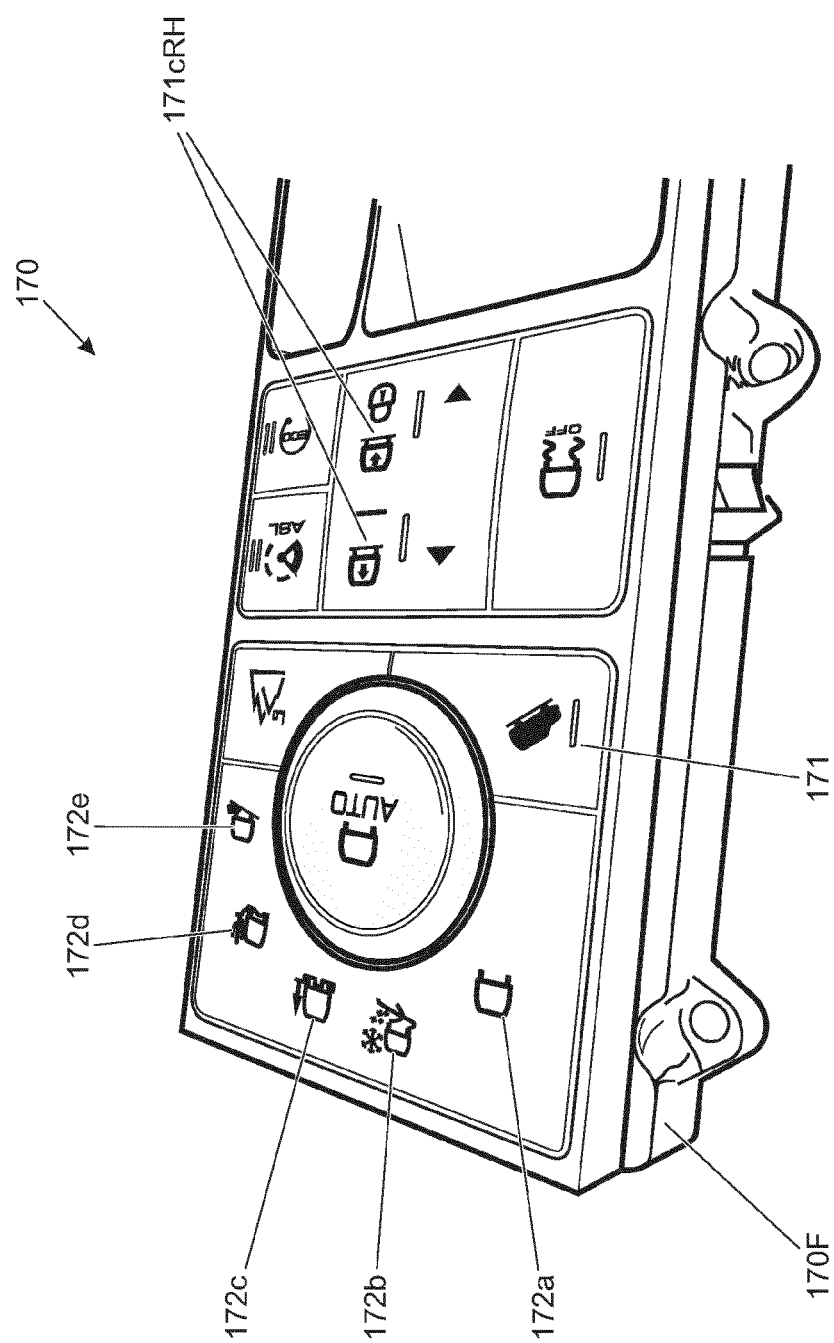
FIG. 5 is a schematic illustration of a switchpack according to an embodiment of the invention with a rotary knob in a retracted condition.

The switchpack 170 has a frame 170F supporting switchgear associated with the switchpack 170. The switchpack 170 has a rotary knob 172 connected to a multistable rotary switch (not shown). The knob 172 may be moved between an exposed or deployed position as shown in FIG. 3 and a retracted position as shown in FIG. 5. In the exposed position the knob 172 stands proud of a panel 172P which surrounds the knob 172. Icons 172a-e are marked in the panel at circumferentially spaced apart locations around the knob 172 over an arc of around 140° in the embodiment shown although other angles and other numbers of modes are also useful. The icons 172a-e may be illuminated selectively in order to indicate the identity of the control mode in which the subsystems 12 are being operated.

Other switches 171a, b are also provided in a remaining portion of the panel 172P allowing a driver to activate a hill descent control (HDC) function, via switch 171a, and select a required gear ratio of the PTU 137 ('high' or 'low'), via switch 171b.

Further switches 171c of the switchpack enable the SCS system of the vehicle to be activated or deactivated, a ride height to be adjusted (buttons 171c'), an 'eco' mode (arranged to enhance fuel economy) to be selected and an automatic speed limiter (ASL) function to be selected.

The rotary knob 172 has a substantially cylindrical column portion 174 with its cylinder axis oriented substantially vertically. The knob 172 has an upper panel 175 bearing the word 'AUTO'. When the knob 172 is in the retracted position an indicator lamp 175L of the panel 175 illuminates, indicating that the VCU 10 has assumed the automatic condition in which the VCU 10 selects automatically an appropriate subsystem control mode.

When the knob 172 is in the exposed position the indicator lamp 175L is extinguished, indicating that the VCU 10 has assumed the manual condition. The knob 172 is moved between the exposed and retracted positions by means of a spring mechanism triggered by pressing on the panel 175.

Other arrangements are also useful such as an electrical actuator. In some embodiments a switch is integrated into the knob 172 such that pressing on the panel 175 alone actuates the switch to switch between the automatic and manual conditions. In some embodiments the switch is positioned such that sufficient axial pressure applied to substantially any exposed portion of the knob 172 including rim 172R results in actuation of the switch. The knob 172 may be configured to exercise a relatively small axial translation when the switch is actuated, providing tactile feedback to the user, followed by a relatively large axial translation as the knob 172 moves between the exposed and retracted positions or vice versa.

The knob 172 is configured such that the rim 172R may be grasped by the user and rotated about a cylinder axis of the column portion 174. The switchpack 170 is arranged such that the VCU 10 may determine in which direction the user turns the rim 172R based on a signal output by the switchpack 170. In an example rim 172R is provided with a knurled peripheral surface arranged to facilitate the user grasping the knob 172 with their fingers.

Rotation of the rim 172R is indexed in discrete angular increments of around 10-20° by means of a detent mechanism. This allows tactile feedback to be provided to a user confirming when the knob 172 has been rotated through one of the discrete angular increments. Other angles and other arrangements are also useful. The rim 172R may be rotated by any number of turns in either direction without constraint by the switchpack 170.

In some embodiments, when the VCU 10 is in the manual condition, rotation of the rim 172R by two increments in a clockwise (or anticlockwise) direction causes the VCU 10 to assume the mode corresponding to the icon 172a-e that is located adjacent the icon corresponding to the currently selected mode in a clockwise (or anticlockwise) direction. If no such icon exists then the VCU 10 takes no action and the currently selected mode remains selected. If the user rotates the knob 172R by only a single increment in a given direction, with no further increment in that direction within a prescribed time period (such as 1 s or any other suitable period), no change in control mode takes place. This feature reduces a risk that a user unintentionally changes the selected mode. It is to be understood that any prescribed number of turns by the incremental amount may be required in order to enable a mode change to take place. Furthermore, any prescribed time period may be set within which the prescribed number of turns by the incremental amount (or in addition, or instead any two consecutive incremental amounts) are to take place. In some embodiments, a user is required to rotate the rim 172R by only a single incremental amount in order to signal a requirement to change mode.

In some embodiments, in addition to or instead of rotating the rim 172R of the knob 172 in order to change control mode when the VCU 10 is in the manual condition, the knob 172 may be configured such that mode changes may be effected by rotation of column 174. In some embodiments the rim 172R may be rotatable whilst the column 174 remains stationary, whilst in some alternative embodiments the rim 172R and column 174 may be arranged to rotate together. They may for example be fixedly coupled or integrally formed in some embodiments.

In some embodiments, the VCU 10 may be configured to allow manual selection of a given control mode following user selection of that mode only once it has determined that the user has finished rotating the rim 172R. The VCU 10 may wait a prescribed period of time after the last incremental rotation has been detected, for example up to around 2 s, before allowing a mode change to take place. In some embodiments the VCU 10 may be arranged to effect a mode change a predetermined time after it has been determined that the user has released their grip from the knob 172.

In some embodiments the VCU 10 may be arranged to verify that one or more prescribed vehicle settings or parameters are appropriate to the mode the user wishes to select before allowing a mode change. For example, the VCU 10 may check one or more selected from amongst selected PTU gear ratio, selected ride height and/or one or more other settings. If the settings are not appropriate to the mode the user wishes to select, the VCU 10 may be configured to remain in the current control mode until the settings are determined to be appropriate. In the meantime the VCU 10 may cause the icon of the currently selected mode to remain illuminated. The icon corresponding to that of the mode the user wishes the VCU 10 to assume may be arranged to illuminate intermittently in some embodiments, e.g. by flashing. The user may be informed of the one or more deficiencies in settings identified by the VCU 10. If they are not remedied within a prescribed period of time, or in some embodiments if an attempt to remedy them is not commenced within a prescribed period, the VCU 10 may be configured to operate as if the user had not sought to change mode. That is, information in respect of deficiencies is not displayed any longer, and flashing of the icon corresponding to the proposed mode is terminated.

It is to be understood that when a user activates the automatic condition of the VCU 10 the VCU 10 controls the vehicle subsystems to operate in the most appropriate control mode as determined by the VCU 10. The rotary knob 172 assumes the retracted position and any rotation of the rim 172R by a user does not cause a change in the selected control mode. Rather, it is ignored by the VCU 10.

If whilst the VCU 10 is in the automatic condition the manual condition is activated, the VCU 10 controls the vehicle subsystems automatically to assume the SPO mode, being the mode intended to provide the best compromise in vehicle subsystem adjustment/set-up for normal road and light off-road use. The knob 172 also assumes the exposed position. Icon 172a, which corresponds to the SPO mode, is illuminated.

If a user wishes to select a mode other than the SPO mode, he or she may grasp the rim 172R and rotate the rim 172R in a clockwise direction to select the appropriate mode. If the rim 172R is rotated by two indexed angular increments and the user waits for 2 s, the VCU 10 assumes the GGS mode. Icon 172a is no longer illuminated and icon 172b becomes illuminated. If the rim 172R is rotated by two further angular increments, the vehicle will assume MR mode, icon 172b will no longer be illuminated and icon 172c will be illuminated instead, and so forth. As noted above, the number of angular increments through which the rim 172R must be rotated in order to select a different mode may be any suitable number such as 1, 3 or any other suitable number. Any other suitable user wait period may also be employed.

Thus it is to be understood that the angular position of the rim 172R when the automatic condition was last selected is irrelevant to the determination of the control mode the VCU 10 will assume when the manual condition is subsequently selected. Regardless of the control mode that was selected when the knob 172 was last retracted, when the knob 172 is subsequently exposed VCU 10 selects the SPO control mode. Because the rim 172R is freely rotatable without constraint (due to the absence of features constraining rotation such as an end stop to prevent further rotation in a given direction) the actual (absolute) angular position of the rim 172R is irrelevant. It is to be understood that if this feature were not employed and the rim 172R were required to be in a prescribed absolute rotational position in order to select SPO mode, additional (automatic) actuation of the rim 172R by the switchpack 170 would be required when transitioning from the automatic to manual conditions of the VCU 10. For example, if the rim 172R had been set to select RB mode prior to the user selecting the automatic condition of the VCU 10, the switchpack 170 would be required to rotate the rim 172R from the position corresponding to the RB mode to that corresponding to the SPO mode when manual mode were subsequently selected. Additional, potentially complicated failsafe countermeasures would be required.

It is to be understood that in some alternative embodiments, when the automatic condition is deselected and the manual condition is assumed, the VCU 10 may be arranged to remain in the driving mode that was selected automatically by the VCU 10 when in the automatic condition until the user selects a different driving mode by rotation of the rim 172R. Thus, when the manual condition is selected, the icon 172a-e corresponding to the currently (automatically) selected driving mode remains illuminated. If the VCU 10 is configured such that none of icons 172a-e are illuminated when the VCU 10 is in the automatic condition then the icon corresponding to the currently selected driving mode is illuminated when the manual condition is assumed.

It is to be understood that other arrangements are also useful.

It is to be understood that when the VCU 10 is operating in the manual condition, the HDC function may be selected by means of switch 171a. When active, the HDC function limits a rate of progress (i.e. a speed) of the vehicle 100 over ground when descending a slope to a prescribed value by application of a foundation braking system of the vehicle 100. In the vehicle 100 of FIG. 1 the foundation braking system is provided by a friction braking system. In some embodiments the foundation braking system may be provided by a regenerative braking system in addition or instead. HDC functionality is described in UK patents GB2325716, GB2308415, GB2341430, GB2382158 and GB2381597.

Rock-Away Mode

As noted above, the vehicle 100 has first and second monostable paddle input controls 181P1, 181P2 operable to cause the transmission 124 to switch to a lower gear by means of the first paddle input control and a higher gear by means of the second paddle input control in a known manner.

The vehicle 100 is also operable in a 'rock-away' mode in which the first and second paddles do not cause the transmission 124 to switch to higher or lower gears. Rather, operation of the first paddle input control 181P1 causes the transmission 124 to assume an operating mode corresponding to travel in a reverse direction whilst operation of the second paddle input control 181P2 causes the transmission 124 to assume an operating mode corresponding to travel in a forward direction (or vice versa). The paddle input controls 181P1, 181P2 are arranged for manual operation/actuation by a user by pulling on the controls 181P1, 181P2. In some alternative embodiments, the paddle input controls 181P1, 181P2 may be arranged for operation/actuation by pressing thereon.

In the present embodiment the paddle input controls 181P1, 181P2 are mounted to the steering wheel 171. In some alternative embodiments the paddle input controls 181P1, 181P2 may be mounted to a steering column (not shown), a dashboard (not shown), a centre console (not shown) or any other suitable location. In some embodiments, a change of operating mode of the transmission 124 to travel in an opposite direction may be triggered by means of an alternate monostable or bistable control, for example a multifunction control such as a joystick or a rocker switch. In some embodiments, in addition or instead a change of direction may be triggered by operation of a single paddle or other single control, such that the transmission toggles between forward and reverse directions when the control is operated.

The feature that a monostable or bistable control may be used to trigger a change in transmission operating mode has the advantage that driver workload may be reduced. This is because rather than manipulating a multistable transmission operating mode selector such as dial 124S from a mode corresponding to travel in one direction to a mode corresponding to travel in the opposite direction, and ensuring that the correct mode is selected, in some embodiments the user simply operates a single monostable or bistable control to cause the required transmission operating mode to be selected. Thus the user does not have to worry about pushing, pulling or twisting the control through too great or too little an amount as in the case of known transmission selectors. In the case of known transmission selectors, moving the selector an insufficient or excessive amount may result in failure to select a mode for travel in the opposite direction. For example, in some embodiments, if a user attempts to select the reverse operating mode from the forward drive operating mode, and turns the selector 124S by an insufficient amount, the transmission 124 may assume the neutral operating mode. If the user turns the selector 124S through too great an amount, the transmission 124 may assume the park mode.

Figure 6:
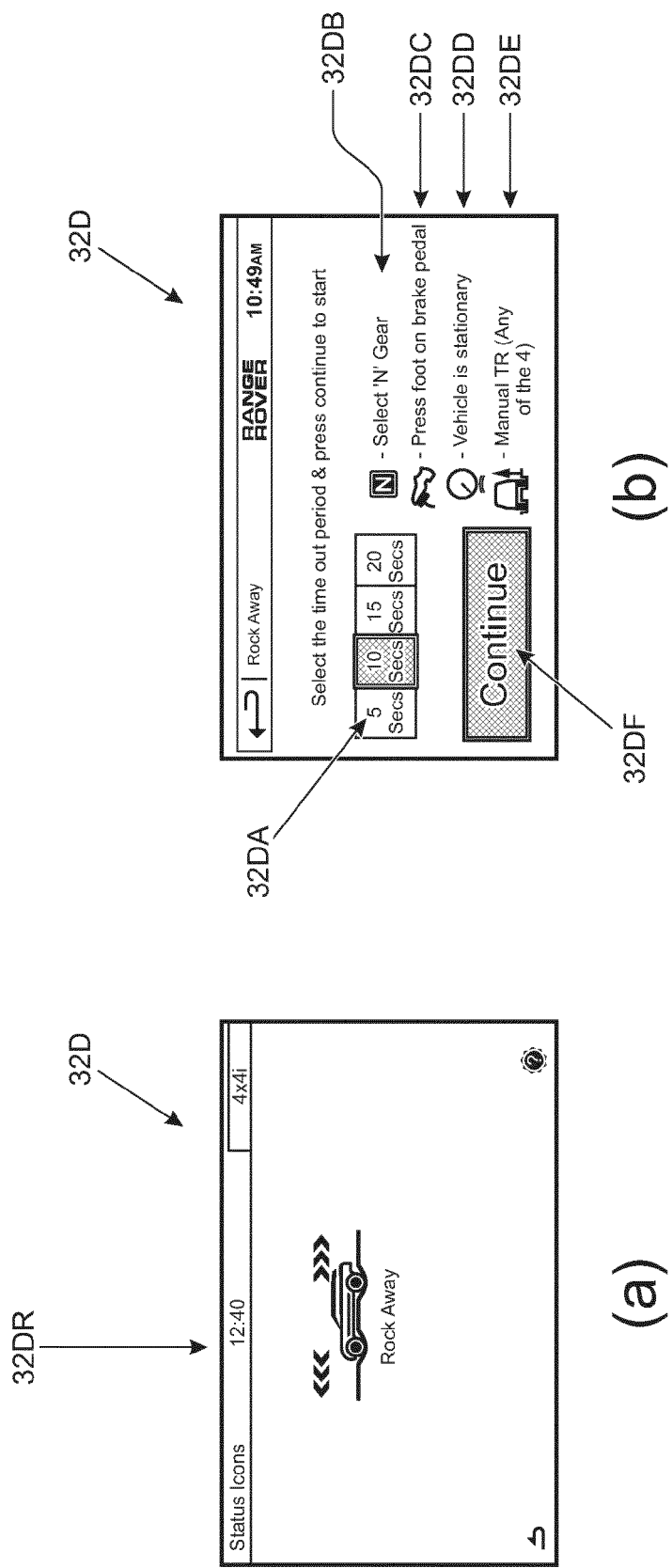
FIG. 6 is (a) a screen shot of a menu page displayed on a display screen showing a rock-away mode icon allowing the rock-away mode to be selected and (b) a screen shot of a page displayed when a user touches the rock-away mode icon.

In the present embodiment, the VCU 10 is configured to allow a user to select the rock-away mode by reference to the HMI display screen 32D. FIG. 6(*a*) is a screen shot of an 'off road operations' menu page upon which a 'rock-away mode' icon 32DR is displayed when the off-road operations menu is selected. If a user selects the rock-away mode, by touching the rock-away mode icon 32DR, the HMI module 32 causes a set of icons to be displayed on the display screen 32D. FIG. 6(*b*) is a screen-shot of the page displayed when a user touches the rock-away mode icon 32DR.

The user may vary a required value of time-out period time-out_period by touching the screen in a region 32DA of the display 32D corresponding to the required value of time-out_period. The time-out period is the amount of time, following actuation of one of the paddle input controls 181P1, 181P2 when the rock-away mode has been activated, the expiry of which causes the VCU 10 to assume a 'rock-away mode suspended state' if a paddle input control 181P1, 181P2 is not actuated before the period expires.

In the present embodiment the user is requested to select a value of time-out_period selected from amongst 5 s, 10 s, 15 s and 20 s. Once a value of time-out_period has been selected, the user must cause a set of rock-away mode entry conditions to be met before the rock-away mode may be activated. The HMI module 32 causes a set of rock-away entry condition icons 32DB, 32DC, 32DD, 32DE to be displayed on the display screen 32D, each icon corresponding to one of the four entry conditions that must be met in order for the rock-away mode to be assumed or activated.

The conditions listed are:
  (a) The transmission must be in the neutral operating mode, icon 32DB;
  (b) The brake pedal 163 must be depressed, icon 32DC;
  (c) The vehicle 100 must be substantially stationary, icon 32DD; and
  (d) The VCU 10 must be operating in the manual operating mode selection mode, and in one of the MR mode, GGS mode, sand mode or RC mode, icon 32DE. The VCU 10 must not be operating in the SPO mode.

Condition (a) is advantageous in that the driver must actuate one of the paddle input controls 181P1, 181P2 before drive torque can be transmitted to the driveline 131 via the transmission 124. Conditions (b) and (c) are advantageous in that they permit the VCU 10 to ensure that a driver is fully in control of vehicle speed before allowing the rock-away mode to be activated. Condition (d) has the advantage that the VCU 10 may ensure the vehicle is travelling in off-road conditions before allowing the rock-away mode to be activated. In respect of condition (b), the VCU 10 is configured to confirm that the brake pressure (e.g, by measuring the pressure of brake fluid in a braking system) is greater than a predetermined rock-away activation brake pressure threshold value before the condition is deemed to be met, in addition to confirming that the brake pedal 163 is depressed. In some alternative embodiments the VCU 10 is configured only to check that the brake pressure exceeds the threshold value. In some further alternative embodiments the VCU 10 is configured only to check that the brake pedal 163 is depressed by a predetermined amount, for example an amount sufficient to cause a brake pedal actuation sensor to determine that the brake pedal 163 has been depressed.

The icons 32DB-32DE corresponding to each respective condition (a) to (d) are displayed in grey if the respective condition is not met, and in a predetermined colour other than grey if the condition is met. In the present embodiment the predetermined colour is green. When each of the conditions (a) to (d) are determined to be met, a rock-away activation icon 32DF placarded 'Continue' also transitions from a grey colour to a predetermined colour other than grey, in the present embodiment a green colour, allowing a driver to activate the rock-away mode by touching the icon 32DF.

Figure 7:
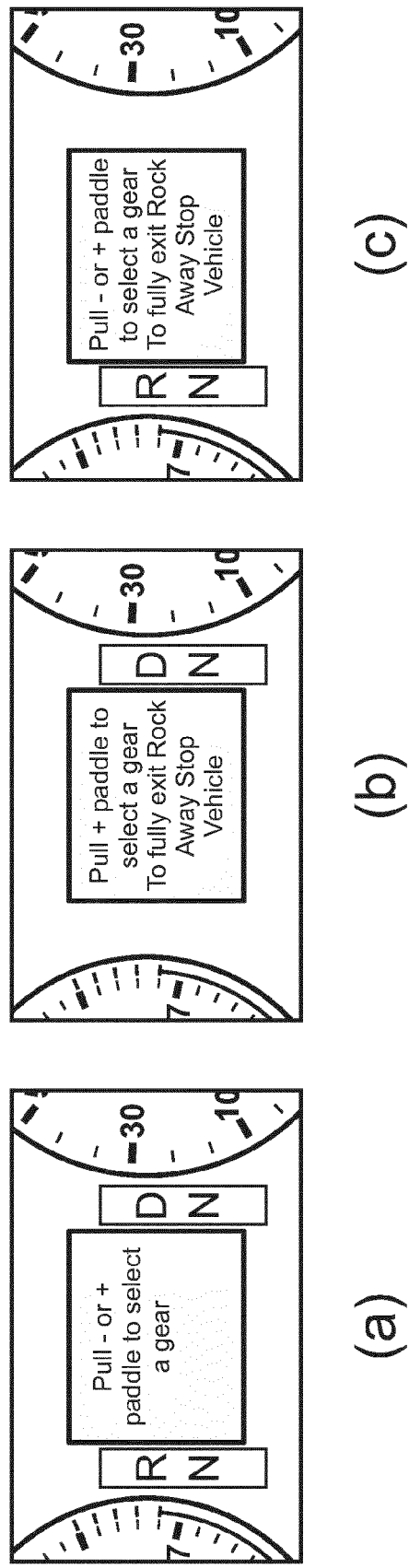
FIG. 7 is (a) a screen shot of the display screen of FIG. 6 when the rock-away mode is active, (b) a screen shot of the display screen of FIG. 6 when the rock-away mode suspended condition has been assumed when a transmission of the vehicle was in a forward driving mode and (c) a screen shot of the display screen of FIG. 6 when the rock-away mode suspended condition has been assumed when a transmission of the vehicle was in a reverse driving mode.

When the rock-away mode is activated, the HMI display screen 32D switches to a 'rock-away active' page of which FIG. 7(*a*) is a screen shot. Transmission operating mode selector dial 124S assumes the retracted condition and the functionality of the paddle input controls 181P1, 181P2 is changed. When the rock-away mode is activated the paddle input controls 181P1, 181P2 are configured to cause the transmission 124 to switch between the forward operating mode, the neutral operating mode and the reverse operating mode in sequence, depending on which control 181P1, 181P2 is actuated. If the transmission 124 is in the forward or neutral operating modes, a single actuation of the first paddle input control 181P1 (also referred to as a '−' ('minus') paddle input control) causes the transmission 124 to switch to the neutral or reverse driving modes, respectively. If the transmission 124 is in the reverse or neutral driving modes, a single actuation of the second paddle input control 181P2 (also referred to as a '+' ('plus') paddle input control) causes the transmission 124 to switch to the neutral or forward modes, respectively. Furthermore, if the transmission 124 is in the forward or reverse modes, a single actuation of either input control 181P1, 181P2 causes the transmission 124 to assume the neutral mode. It is to be understood that the feature that the transmission 124 switches from the forward to the reverse or from the reverse to the forward operating modes by first assuming the neutral mode, and that depressing either paddle input control 181P1, 181P2 results in the neutral mode being selected if a forward or reverse mode is currently selected, has the feature that if a user wishes to disengage the transmission 124 for any reason, and assume the neutral mode, they may readily do so by means of either one of the paddle input controls 181P1, 181P2. The 'rock-away active' page displayed on the HMI display screen 32D indicates the transmission modes available by actuation of each of the paddle input controls 181P1, 181P2.

It is to be understood that the transmission 124 is not permitted to assume the sport driving mode when the vehicle is in the rock-away mode, or a rock-away mode suspended state described below.

In the present embodiment, the rock-away mode may be deactivated by a driver by touching a 'rock-way exit' icon displayed on display screen 32D when the rock-away mode is active.

If the driver presses the 'rock-way exit' icon when the conditions for exit or deactivation of the rock-away mode are met, the VCU 10 exits the rock-away mode and the display screen 32D reverts to the screen shown in FIG. 6(*a*).

The rock-away exit conditions are:
  (a) The vehicle 100 must be substantially stationary; and
  (b) The brake pedal 163 must be depressed (and the pressure of brake fluid in a braking system must be greater than a predetermined rock-away activation brake pressure threshold value).

If a user touches the rock-away deactivation icon when one or more of conditions (a) and (b) are not met, for example if the driver touches the rock-away deactivation icon whilst the vehicle 100 is moving, the VCU 10 assumes a rock-away mode suspended state in which the functionality of the paddle input controls 181P1, 181P2 is changed. The functionality is changed such that the VCU 10 does not permit a transmission operating mode to be selected corresponding to movement in a direction opposite that corresponding to the operating mode of the transmission 124 when the suspended state is assumed. If the transmission 124 is in the neutral mode when the suspended state is assumed, the VCU 10 does not permit the transmission 124 to assume either the forward or the reverse operating mode whilst in the suspended state. In contrast, if the transmission 124 was in the forward driving mode when the suspended state was assumed, the VCU 10 permits the transmission 124 to switch back and forth between the forward driving mode and neutral mode when the second paddle input control 181P2 is actuated, but does not permit the reverse driving mode to be assumed if the first paddle input control 181P1 is actuated. Actuation of the first paddle input control 181P1 causes the transmission 124 to assume the neutral mode if it is the forward driving mode, in the manner described above, if the forward driving mode was the selected driving mode at the time the VCU 10 entered the suspended state.

Conversely, if the transmission 124 was in the reverse driving mode when the suspended state was assumed, the VCU 10 permits the transmission 124 to switch back and forth between the reverse driving mode and neutral mode when the first paddle input control 181P1 is actuated, but does not permit the forward driving mode to be assumed if the second paddle input control 181P2 is actuated. Actuation of the second paddle input control 181P2 causes the transmission 124 to assume the neutral mode if it is the reverse driving mode, in the manner described above, the reverse driving mode was the selected driving mode at the time the VCU 10 entered the suspended state.

It is to be understood that in some alternative embodiments, other arrangements may be useful. For example, in one alternative embodiment, if the transmission 124 was in the forward driving mode when the suspended state was assumed, the VCU 10 permits the transmission 124 to switch from the forward driving mode to the neutral mode only when the first paddle input control 181P1 is actuated. However the VCU 10 does not permit the reverse driving mode to be assumed if the first paddle input control 181P1 is actuated a second time. Actuation of the second paddle input control 181P2 causes the transmission 124 to change from the neutral mode into the forward driving mode, in the manner described above if that was the selected driving mode at the time the control entered the suspended state. Conversely, if the transmission 124 was in the reverse driving mode when the suspended state was assumed, the VCU 10 permits the transmission 124 to switch from the reverse driving mode to the neutral mode when the second paddle input control 181P2 is actuated (but not the first paddle input control 181P1), but does not permit the forward driving mode to be assumed if the second paddle input control 181P2 is actuated again. Actuation of the first paddle input control 181P1 causes the transmission 124 to subsequently reassume the reverse mode from the neutral mode if the reverse driving mode was selected at the time that operation in the suspended mode was assumed.

FIG. 7(*b*) is a screen shot of the HMI display screen 32D of the vehicle 100 in the case that the rock-away mode suspended state is assumed whilst the transmission is in the forward driving mode D. The letters 'D' and 'N' are displayed on a white background to the right of the screen below a graphical representation of the second paddle input control 181P2, indicating that the forward driving mode and neutral mode of the transmission 124 are available for selection by a user. A text message is also displayed informing a user that the '+' paddle 181P2 may be actuated to select a gear. The message also informs a user as to how the rock-away mode suspended mode may be exited such that rock-away functionality is stopped. The message indicates that the driver must fully stop the vehicle in order to exit the rock-away mode suspended mode. In the present embodiment it is not possible to resume operation in the rock-away mode once the rock-away mode suspended mode has been assumed, without first exiting the rock-away mode suspended mode, and re-selecting the rock-away mode from the menu page a screen shot of which is shown in FIG. 6(*a*).

FIG. 7(*c*) is a corresponding screen shot of the HMI display screen 32D in the case that the rock-away mode suspended state is assumed whilst the transmission is in the reverse driving mode R. The discussion above in respect of available functionality and exiting of the rock-away mode suspended state applies in a corresponding manner to the rock-away mode suspended state assumed whilst the transmission is in the reverse driving mode R.

In the present embodiment, as noted above, the rock-away mode suspended state is also assumed if, whilst the VCU 10 is in the rock-away mode, i.e. the rock-away mode is active, a user does not operate either of the paddle input controls 181P1, 181P2 for more than the predetermined time-out period time-out_period. Furthermore, the rock-away mode suspended state is also assumed if vehicle speed exceeds a predetermined rock-away mode maximum speed value rock-away_maxspeed. In the present embodiment, the value of rock-away_maxspeed is set to a value of 8 km/h although other values are also useful. It is to be understood that in the present embodiment the parameter rock-away_maxspeed corresponds to a value of vehicle reference speed which is determined by reference to wheel speeds in the present embodiment. A value of reference speed determined by reference to one or more other parameters may be used in addition or instead in some embodiments, for example a direct measure of speed over ground determined by reference, for example, to images captured by a camera, data gathered by means of a radar or ultrasonic transceiver system, or any other suitable means. It is to be understood that the value of rock-away_maxspeed may be adjusted depending on whether speed is measured indirectly, by reference to wheel speed, or directly, by reference to vehicle speed over ground. The value of rock-away_maxspeed may for example by higher in the case that speed is measured by reference to wheel speed, to take into account that relatively high levels of wheel slip may be experienced when performing a rock-away operation in slippery conditions such as on muddy or snowy surfaces. It is to be understood that assumption by the VCU 10 of the rock-away mode suspended state when a paddle input control 181P1, 181P2 is not actuated for more than a predetermined time period, or when vehicle speed exceeds rock-away_maxspeed, has the advantage that if a driver has managed to exit a location in which the vehicle 100 was stuck, such as a rut or depression, and is making progress in a forward or reverse direction away from the location, a risk that inadvertent operation of a paddle input control 181P1, 181P2 causes an unintended reversal of vehicle direction is reduced. Other arrangements may also be useful in some embodiments.

In the present embodiment, whilst the VCU 10 is in the rock-away mode or the rock-away mode suspended mode, an indication of the mode in which the transmission 124 is operating is displayed on a display associated with and adjacent the transmission selector dial 124S in the usual manner, as well as on the display screen 32D. The operating mode of the transmission is also displayed on the display screen 32D by highlighting the symbol (D, N or R) corresponding to the currently selected transmission operating mode. This feature has the advantage that a user may readily determine the currently selected transmission operating mode at any time during vehicle operations.

It is to be understood that once the VCU 10 is no longer operating in either the rock-away mode or the rock-away mode suspended state, the transmission operating mode selector dial 124S assumes the deployed condition, and the display associated with and adjacent the transmission selector dial 124S displays the currently selected transmission operating mode.

In the present embodiment, the VCU 10 is permitted to assume the rock-away mode regardless of the state of the PTU 137, i.e. regardless of whether the PTU 137 is in the high or low ratio configurations.

The vehicle 100 of FIG. 1 is fitted with a reverse view camera 124C mounted in a rear-facing manner at a location to the rear of the vehicle 100. The camera 124C is configured to provide to the HMI module 32 a video feed showing a view rearward of the vehicle 100 to aid a driver in avoiding collision with obstacles whilst reversing. The VCU 10 is configured to cause a video feed provided by the reversing camera to be displayed on a reverse view camera display 124CD provided adjacent the HMI display screen 32D. In the present embodiment, the VCU 10 is configured to cause the HMI module 32 to provide the video feed from the reverse view camera 124C substantially continuously whilst the vehicle is in the rock-away mode, regardless of whether the transmission 124 is in the forward, neutral or reverse operating modes, and in the rock-away mode suspended mode in the case that the rock-away mode suspended mode is assumed whilst the transmission 124 is in the reverse driving mode. It is to be understood that other arrangements may be useful in some embodiments.

Furthermore, in the present embodiment an audio alert signal is generated when the transmission 124 is in a reverse driving mode; in the present embodiment the audio alert signal is generated within a cockpit of the vehicle 100 and is not intended to be audible externally of the vehicle 100 although in some embodiments an external audible signal may be generated. In the present embodiment, generation of the audio alert signal is suspended, i.e. the signal is not generated, when the reverse driving mode is selected, when the VCU 10 is operating in the rock-away mode. If the VCU 10 is operating in the rock-away mode suspended mode, the audio alert signal is generated in the conventional manner if the reverse driving mode is assumed. Other arrangements may also be useful. For example, in some embodiments the audio alert signal may be generated substantially continuously when the vehicle is in the rock-away mode or rock-away mode suspended mode if the rock-away mode suspended mode is assumed when the transmission 124 is in the reverse operating mode.

Figure 8A:
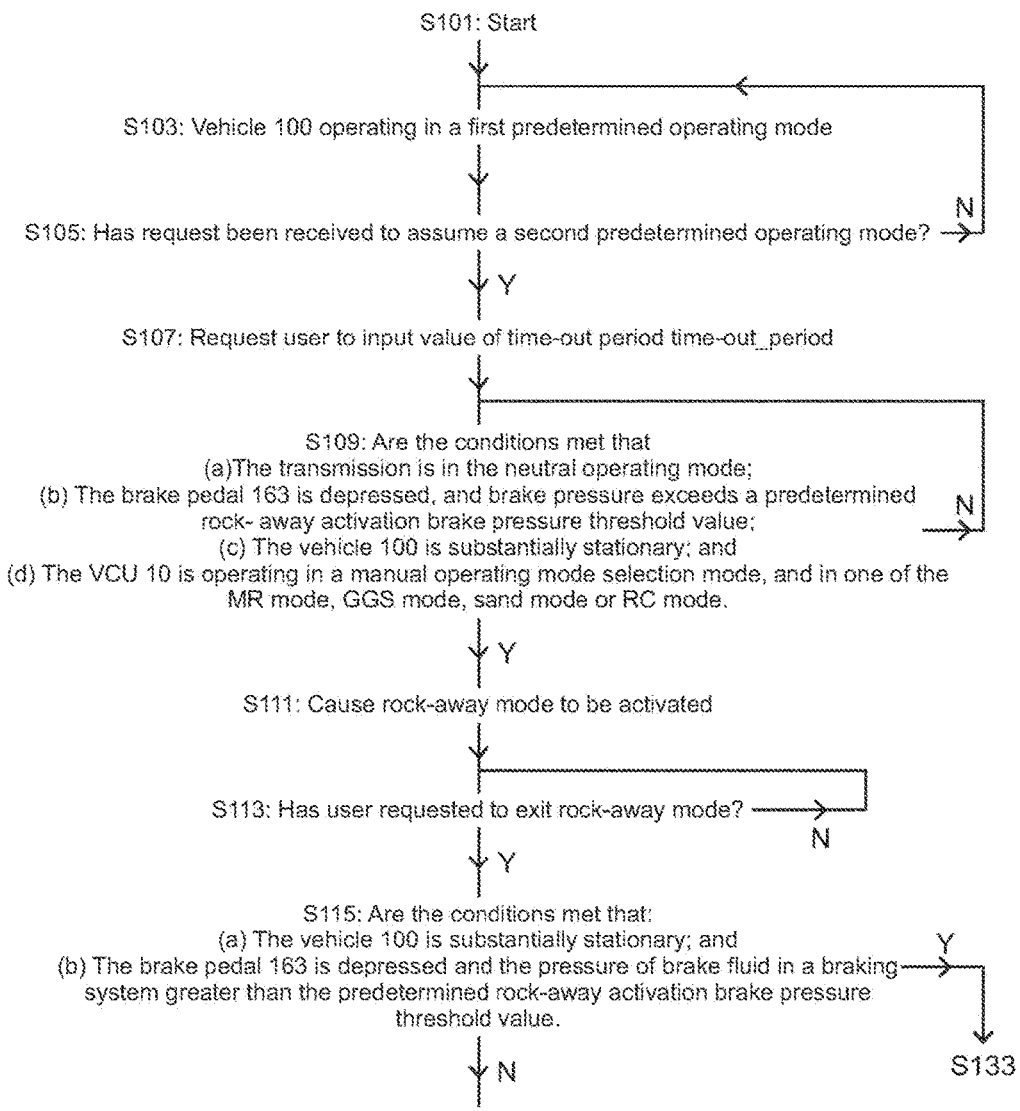
FIGS. 8A and 8B together comprise FIG. 8 which is a flow diagram illustrating a method of operation of a vehicle according to an embodiment of the present invention.
Figure 8B:
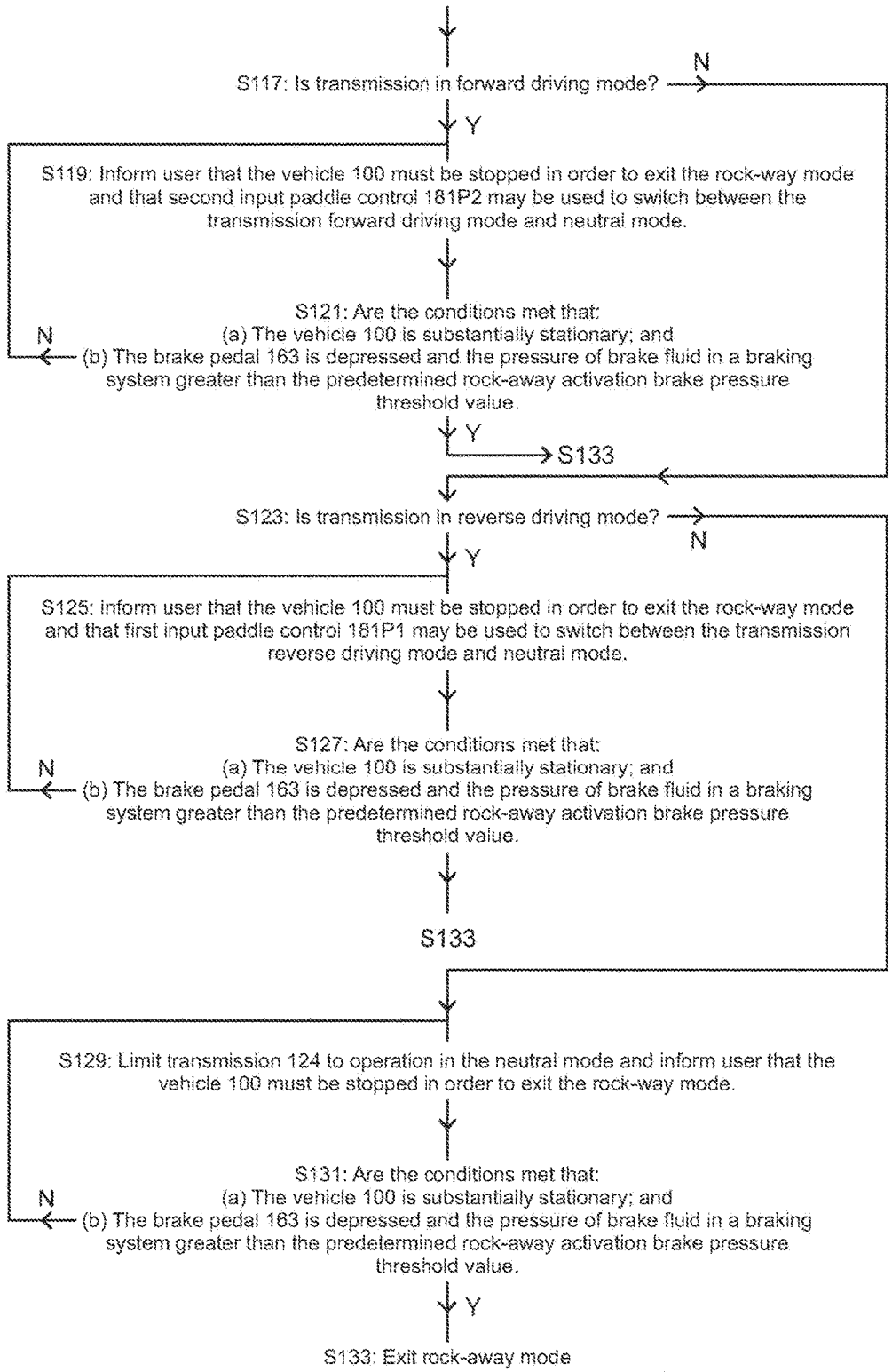

FIG. 8 is a flow diagram illustrating a method of operating the vehicle 100 of FIG. 1.

At step S101 the method commences. At step S103 the VCU 10 is operating in a first predetermined operating mode, corresponding to the rock-away mode not being active.

At step S105 the VCU 10 determines whether a request has been received to assume a second predetermined mode, being the rock-away active mode. If such a request has not been received the method continues at step S103 else the method continues at step S107.

At step S107 the VCU 10 requests the user to input, via the display screen 32D of the HMI module 32, a value of time-out period time-out_period. The user inputs the value by touching a corresponding icon displayed on the screen 32D as shown in FIG. 6(*b*) and described above. The method then continues at step S109.

At step S109 the VCU 10 determines whether the following conditions are met:
(a) The transmission is in the neutral operating mode;
(b) The brake pedal 163 is depressed, and brake pressure exceeds a predetermined rock-away activation brake pressure threshold value;
(c) The vehicle 100 is substantially stationary; and
(d) The VCU 10 is operating in a manual operating mode selection mode, and in one of the MR mode, GGS mode, sand mode or RC mode.

If these conditions are met, the VCU 10 continues at step S111 else step S109 is repeated.

At step S111 the VCU 10 causes the rock-way mode to become active.

At step S113 the VCU 10 checks whether a request has been received from a user to exit the rock-away mode. If no such request has been received, step S113 repeats else the method continues at step S115.

At step S115 the VCU 10 checks whether the following conditions are met, being the conditions that must be met before the rock-away mode may be exited:
(a) The vehicle 100 is substantially stationary; and
(b) The brake pedal 163 is depressed and the pressure of brake fluid in a braking system is greater than the predetermined rock-away activation brake pressure threshold value.

If the conditions are met, the method continues at step S133 else the method continues at step S117.

At step S117 the VCU 10 assumes a rock-away mode suspended condition and determines whether the transmission 124 of the vehicle 100 is in the forward driving mode.

If the transmission 124 is not in the forward driving mode the method continues at step S123 else the method continues at step S119.

At step S119 the VCU 10 informs the user via display screen 32D that the vehicle must be stopped in order to exit the rock-way mode, and that second input paddle control 181P2 may be used to switch between the transmission forward driving mode and neutral mode. It is to be understood that, in the present embodiment, if the VCU 10 is in the rock-away mode or the rock-away mode suspended condition, either paddle control 181P1, 181P2, may be used to cause the transmission 124 to switch from a forward or reverse driving mode to the neutral mode. This feature has the advantage that if a user wishes to cause the transmission 124 to assume the neutral mode urgently, the user does not have to remember which paddle control 181P1, 181P2 they must actuate in order to accomplish this; rather, actuation of either paddle control 181P1, 181P2 will accomplishes the desired result of causing the neutral mode to be assumed.

The method then continues at step S121. At step S121 the VCU 10 checks whether the following conditions are met:

(a) The vehicle 100 is substantially stationary; and (b) The brake pedal 163 is depressed and the pressure of brake fluid in a braking system is greater than the predetermined rock-away activation brake pressure threshold value.

If conditions (a) and (b) are met, the method continues at step S133 else the method continues at step S119.

As noted above, if at step S117 the VCU 10 determines that the transmission 124 is not in the forward driving mode the method continues at step S123.

At step S123 the VCU 10 determines whether the transmission 124 is in the reverse driving mode. If the transmission 124 is in the reverse driving mode the method continues at step S125 else the method continues at step S129.

At step S125, the VCU 10 informs the user via display screen 32D that the vehicle 100 must be stopped in order to exit the rock-way mode, and that first input paddle control 181P1 may be used to switch between the transmission reverse driving mode and neutral mode. It is to be understood that, as noted above, in the present embodiment, if the VCU 10 is in the rock-away mode or the rock-away mode suspended condition, either paddle control 181P1, 181P2, may be used to cause the transmission 124 to switch from a forward or reverse driving mode to the neutral mode.

The method then continues at step S127. At step S127 the VCU 10 checks whether the following conditions are met:

(a) The vehicle 100 is substantially stationary; and (b) The brake pedal 163 is depressed and the pressure of brake fluid in a braking system greater than the predetermined rock-away activation brake pressure threshold value.

If the conditions are met, the method continues at step S133 else the method continues at step S125.

As noted above, if at step S123 the VCU 10 determines that the transmission 124 is not in the reverse driving mode, and must therefore be in the neutral mode, the method continues at step S129.

At step S129 the VCU 10 causes the transmission 124 to be limited to operation in the neutral mode and informs the user via display screen 32D that the vehicle 100 must be stopped in order to exit the rock-away mode.

At step S131 the VCU 10 checks whether the following conditions are met:

(a) The vehicle 100 is substantially stationary; and (b) The brake pedal 163 is depressed and the pressure of brake fluid in a braking system is greater than the predetermined rock-away activation brake pressure threshold value.

If the conditions are not met, the method continues to step S133 else the method continues at step S129.

At step S133, the VCU 10 exits the rock-away mode. If the VCU 10 is in the rock-away mode suspended condition when step S133 is executed, the rock-away mode suspended condition is exited when the rock-way mode is exited. It is to be understood that in the present embodiment the rock-away mode suspended condition is a state that may be assumed by the VCU 10 when the rock-away mode is active, and results in a limitation of the functionality offered to a user when the VCU 10 is in the rock-away mode but not in the rock-away mode suspended condition.

It is to be understood that other arrangements may also be useful in some embodiments.

Figure 9:
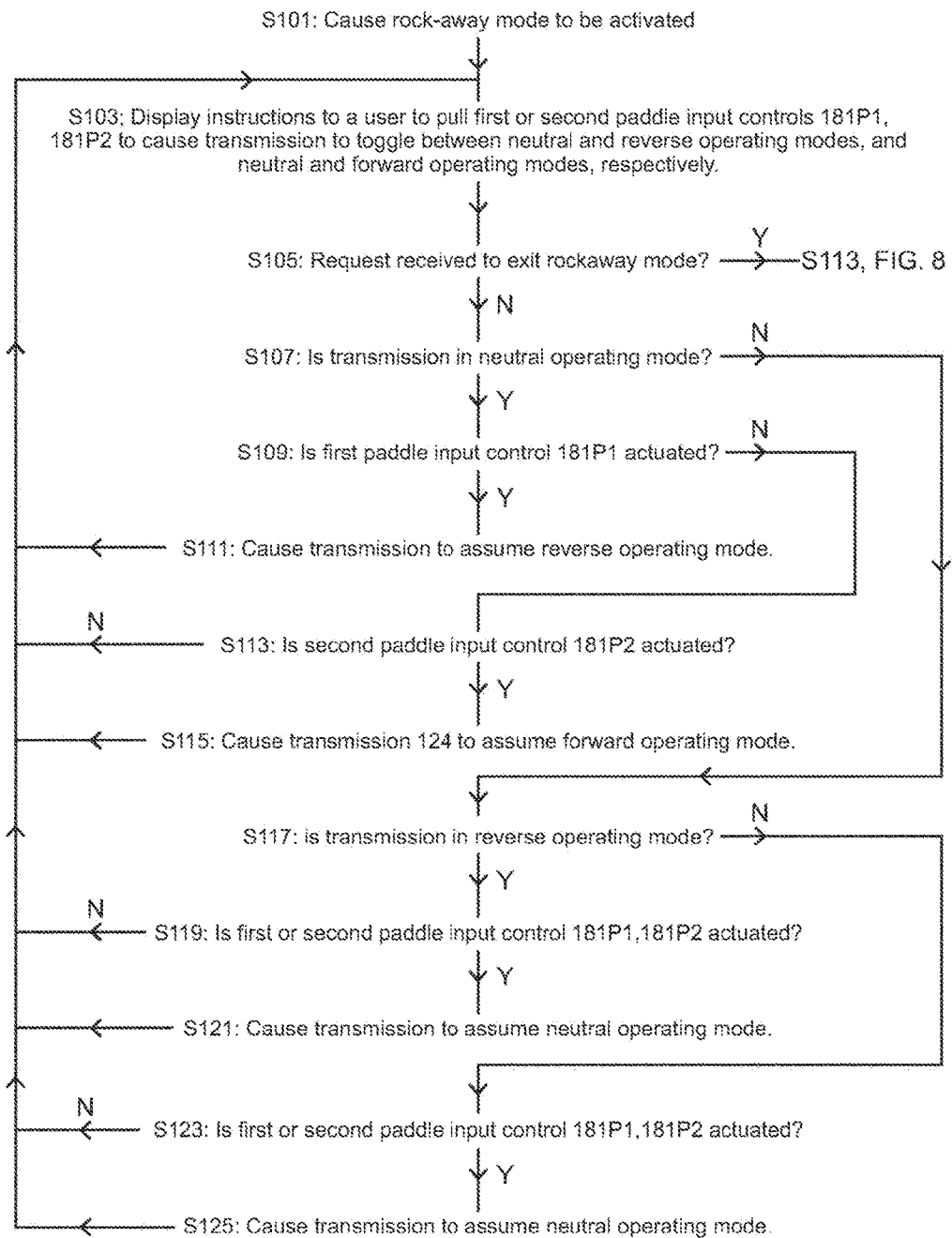
FIG. 9 is a flow diagram illustrating a further method of operation of a vehicle according to an embodiment of the present invention.

FIG. 9 illustrates a further method according to the embodiment FIG. 1. It is to be understood that the method may also be used in embodiments of the present invention that do not embody the method illustrated in FIG. 8, in which case step S105 may direct the VCU 10 to a step other than step S113 of FIG. 8.

With reference to FIG. 9, at step S101, the VCU 10 causes the rock-away mode to be activated.

At step S103, the VCU 10 displays, via the display screen 32D, instructions to a user for operation of the vehicle 100 in the rock-away mode. The VCU 10 informs the user that the user may the pull first or second paddle input controls 181P1, 181P2 to cause the transmission to toggle between neutral and reverse operating modes, and neutral and forward operating modes, respectively.

At step S105 the VCU 10 checks whether a request has been received to exit the rock-away mode. If such a request has been received the VCU 10 continues at step S113 of the method illustrated in FIG. 8. If such a request has not been received the VCU 10 continues at step S107.

At step S107 the VCU 10 checks whether the transmission 124 is in the neutral mode. If the transmission 124 is in the neutral mode the method continues at step S109 else the method continues at step S117.

At step S109 the VCU 10 determines whether the first paddle input control 181P1 has been actuated. If the control 181P1 has been activated the method continues at step S111 else the method continues at step S113.

At step S111 the VCU 10 causes the transmission 124 to assume the reverse driving mode in response to actuation of the first paddle input control 181P1. The VCU 10 then continues at step S103.

As noted above, if at step S109 the VCU 10 determines that the first paddle input control 181P1 has not been actuated the VCU 10 continues at step S113. At step S113 the VCU 10 determines whether the second paddle input control 181P2 has been actuated. If the second paddle input control 181P2 has been actuated the VCU 10 continues at step S115 else the method continues at step S103.

At step S115 the VCU 10 causes the transmission 124 to assume the forward operating mode in response to actuation of the second paddle input control 181P2. The method then continues at step S103.

As noted above, if at step S107 the VCU 10 determines that the transmission 124 is not in the neutral mode the method continues at step S117.

At step S117 the VCU 10 determines whether the transmission 124 is in the reverse operating mode. If the transmission 124 is in the reverse operating mode, the method continues at step S119 else the method continues at step S123.

At step S119 the VCU determines whether either of the first and second paddle input controls 181P1, 181P2 have been actuated. If neither have been actuated, the VCU 10 continues at step S103 else the VCU 10 continues at step S121.

At step S121 the VCU 10 causes the transmission 124 to assume the neutral operating mode, before continuing at step S103.

As noted above, if at step S117 the VCU 10 determines that the transmission 124 is not in the reverse operating mode (and must therefore be in the forward operating mode), the method continues at step S123.

At step S123 the VCU 10 determines whether the first or second paddle input control 181P1, 181P2 has been actuated. If neither control has been actuated the method continues at step S103 else the method continues at step S125.

At step S125 the VCU 10 causes the transmission 124 to assume the neutral operating mode, before continuing at step S103.

It is to be understood that in the present embodiment the VCU 10 is configured to cause the transmission 124 to assume a required mode by issuing a command (or request) to a transmission controller forming part of the transmission system 12c. Other arrangements may be useful in some embodiments.

Some embodiments of the invention have the advantage that a vehicle 100 may be caused to move forwards and backwards in relatively rapid succession in a more convenient and reliable manner, in order to induce traction in one or more wheels of a vehicle 100. The forwards and backwards motion may be referred to as 'rock-away' and may be particularly useful when one or more wheels of a vehicle 100 have become 'stuck' at a location, for example in a rut or other local drop in surface height rendering a vehicle unable to make progress over ground. By inducing repeated forward and backwards motion, a weight of a vehicle may be shifted back and forth between front and rear axles, causing an increase in tractive force between one or more wheels of an axle and ground, which may be sufficient to enable a vehicle to become 'unstuck' and make progress over ground away from the location at which it was stuck.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. A control system for a motor vehicle having a first user-operable transmission selector means for selecting a forward operating mode of a transmission corresponding to travel in a forward direction and a reverse operating mode of the transmission corresponding to travel in a reverse direction opposite the forward direction, the control system comprising:

a user-operable gear selector configured in a first functional mode to, upon receipt of user input, select between a plurality of forward direction gear ratios, and wherein the user-operable gear selector is re-configured in a second functional mode to, upon receipt of user input, select between the forward operating mode and the reverse operating mode, wherein the user-operable gear selector comprises first and second input selectors, wherein in the second functional mode the first input selector is operable, upon receipt of user input, to cause the transmission to switch into or out of the reverse operating mode, and the second input selector is operable, upon receipt of user input, to cause the transmission to switch into or out of the forward operating mode, wherein the first and second input selectors of the user-operable gear selector each comprise a user-actuated paddle switch device; and wherein, when the control system is operated in the second functional mode, the first user-operable transmission selector means is unable to cause a change in transmission operating mode.

2. The control system according to claim 1 wherein the user-operable gear selector is further configured to allow the user to select a neutral operating mode in which the transmission does not allow drive torque to be transmitted to a driveline.

3. The control system according to claim 2 wherein in the second functional mode the user-operable gear selector is configured to switch the transmission, in either direction, between the reverse operating mode, the neutral operating mode, and the forward operating mode in response to user operation of the gear selector.

4. The control system according to claim 3 wherein in the second functional mode the first input selector is operable upon receipt of user input, to cause the transmission to switch from the reverse operating mode to the neutral operating mode, and the second input selector is operable, upon receipt of user input, to cause the transmission to switch from the forward operating mode to the neutral operating mode.

5. The control system according to claim 1 wherein the user-operable gear selector is mounted to one of a steering wheel of the vehicle and a steering column of the vehicle.

6. A vehicle comprising the control system according to claim 1.

7. A vehicle comprising a body, a plurality of wheels, a powertrain comprising the transmission to drive said wheels, a braking system to brake said wheels, and a control system according to claim 1.

8. A method of controlling a motor vehicle using the control system according to claim 1, the method comprising:

allowing the first user-operable transmission selector means to select the forward operating mode of the transmission corresponding to travel in the forward direction and the reverse operating mode of a transmission corresponding to travel in the reverse direction, in the first functional mode, allowing the user-operable gear selector to, upon receipt of user input, select between the plurality of forward direction gear ratios, and re-configuring the user-operable gear selector in the second functional mode to, upon receipt of user input, select between the forward operating mode and the reverse operating mode, wherein operating the control system in the second functional mode renders the first user-operable transmission selector means unable to cause a change in transmission operating mode.

9. The method according to claim 8 comprising allowing the user to select a neutral operating mode in which the transmission does not allow drive torque to be transmitted to a driveline, by means of the first user-operable transmission selector means and the user-operable gear selector.

10. The method according to claim 9 comprising, in the second functional mode, allowing the user to cause the transmission to toggle between the neutral operating mode and the forward operating mode and between the neutral operating mode and the reverse operating mode by means of the user-operable gear selector, whereby when the transmission is in the forward or reverse operating modes, the user must select the neutral operating mode by means of the user-operable gear selector before the user may select by means of the user-operable gear selector the transmission operating mode corresponding to travel in a direction opposite that corresponding to the instantly selected transmission operating mode.

11. A non-transient carrier medium carrying computer readable code for controlling the vehicle to carry out the method of claim 8.

12. A vehicle having a computer program product executable on a processor of the vehicle so as to implement the method of claim 8.

13. A processor arranged to implement the method of claim 8.

* * * * *